(12) United States Patent
Yamamoto

(10) Patent No.: US 7,344,572 B2
(45) Date of Patent: Mar. 18, 2008

(54) REFORMING APPARATUS

(75) Inventor: Tadao Yamamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 690 days.

(21) Appl. No.: 10/806,821

(22) Filed: Mar. 23, 2004

(65) Prior Publication Data

US 2004/0191591 A1   Sep. 30, 2004

(30) Foreign Application Priority Data

Mar. 25, 2003  (JP)  ............... 2003-082149

(51) Int. Cl.
  *B01J 8/00*   (2006.01)
  *H01M 6/04*   (2006.01)
  *H01M 2/00*   (2006.01)
(52) U.S. Cl. .................... 48/127.9; 48/127.9; 429/200; 429/163
(58) Field of Classification Search ............... 48/127.9; 429/12
  See application file for complete search history.

(56) References Cited

U.S. PATENT DOCUMENTS 6,159,434 A * 12/2000 Gonjo et al. ............... 422/191
6,423,945 B1 * 7/2002 Yokota ........................ 219/388
6,569,553 B1   5/2003 Koripella et al.
6,939,632 B2   9/2005 Arana et al.
7,126,548 B2   10/2006 Yano et al.
2003/0054215 A1 * 3/2003 Doshi et al. ................. 429/26
2006/0109188 A1   5/2006 Ikeda et al.

FOREIGN PATENT DOCUMENTS

| JP | 63-42377 | 11/1988 |
|---|---|---|
| JP | 4-119957 | 10/1992 |
| JP | 10-189021 A | 7/1998 |
| JP | 2000-106201 A | 4/2000 |
| JP | 2004-508670 A | 3/2004 |
| JP | 2004-343625 A | 12/2004 |
| JP | 2006-112866 A | 4/2006 |
| WO | WO 02/19452 A2 | 3/2002 |

* cited by examiner

*Primary Examiner*—Walter D. Griffin
*Assistant Examiner*—Frank C Campanell
(74) *Attorney, Agent, or Firm*—Frishauf, Holtz, Goodman & Chick, P.C.

(57) ABSTRACT

A reforming apparatus that generates hydrogen from fuel includes a plurality of reactors each having an internal space and reacting fuel in the internal space, a heat insulating package that contains the plurality of reactors, and a heat insulator that supports the plurality of reactors to be separated from an inner wall of the heat insulating package.

20 Claims, 9 Drawing Sheets

REFORMING APPARATUS

BACKGROUND OF THE INVENTION

1. Field of the Invention

The present invention relates to a reforming apparatus that generates hydrogen from fuel, and more particularly relates to a reforming apparatus that generates hydrogen from a fuel cell.

2. Description of the Related Art

In recent years, miniature electronic equipment such as a cellular phone, a notebook-size personal computer, a digital camera, a PDA (Personal Digital Assistance), and an electronic notebook has been remarkably progressed and developed. As the power source, primary batteries such as an alkali dry cell, a manganese dry cell and secondary batteries such as a nickel-cadmium battery, a nickel-hydrogen battery, a lithium-ion battery are used.

However, when the primary batteries and secondary batteries installed in the electronic equipment are verified in terms of effective use of energy, the effective use of energy is not necessary ensured. As described in, for example, Unexamined Japanese Patent Publication 2000-106201, study and development on the fuel cell that can achieve high energy use efficiency have now been actively conducted for the purpose of an alternative to the primary batteries and secondary batteries.

The fuel cell is one in which fuel is electrochemically reacted with oxygen in the air to directly extract electrical energy from chemical energy, and is placed as a promising battery with much future potential. Though hydrogen is cited as a fuel used in the fuel cell, there is a problem in treatment and storage since it is in a gaseous state at ordinary temperature. Accordingly, the use of a reformer that heats a liquid fuel such as alcohol and gasoline and steam at high temperature to generate hydrogen can be considered. In this-case, a system for storing the liquid fuel may be used since the size thereof is relatively small. In a case where the fuel cell of fuel reforming type is used as a power source of a miniature electronic equipment, not only the fuel cell but also a reformer must be miniaturized.

Generally, the reforming apparatus includes an evaporator, a reformer, and a carbon monoxide remover. The evaporator heats a liquid mixture of liquid fuel and water to evaporate the mixed solution. The reformer through which a pipe passes from the evaporator catalytically reacts a gaseous mixture evaporated by the evaporator by heat to generate hydrogen gas and carbon dioxide gas. The carbon monoxide remover through which a pipe passes from the reformer catalytically reacts carbon monoxide slightly contained in the gaseous mixture sent from via the pipe from the reformer by heat to remove the carbon monoxide from the gaseous mixture. The hydrogen gas of the gaseous mixture containing the hydrogen gas and carbon dioxide gas generated by the reforming apparatus is supplied to the fuel cell from the reforming apparatus to generate electric energy by the fuel cell.

By the way, it is desirable that all heat energy of the evaporator, reformer, and carbon monoxide remover be used in the reaction between water and liquid fuel. However, the heat energy will be partially released outside. Each of the evaporator, reformer, and carbon monoxide remover must be heat-insulated in order to effectively use the heat energy. However, this increases the entire size of the reforming apparatus by a heat insulating structure for heat-insulating the evaporator, reformer, and carbon monoxide remover.

Accordingly, an object of the present invention is to provide a small size reforming apparatus capable of efficiently using heat energy in reaction in multiple reactors such as an evaporator, a reformer, and a carbon monoxide remover.

SUMMARY OF THE INVENTION

In order to solve the aforementioned problem, for example, as illustrated in FIG. 3, a reforming apparatus of the present invention includes a plurality of reactors each having an internal space and reacting fuel in the internal space. The reforming apparatus further includes a heat insulating package containing the plurality of reactors. The reforming apparatus further includes a heat insulator that supports the plurality of reactors to be separated from an inner wall of the heat insulating package.

Here, reaction in each reactor means not only a chemical reaction of fuel but also phase change of fuel.

According to the present invention, since the multiple reactors are contained by the heat insulating package, the heat of these reactors is enclosed in the heat insulating package and the heat losses of these reactors can be extremely reduced. Moreover, since the multiple reactors are supported by the heat insulating member to be separated from the inner wall of the heat insulating package, the heat of these reactors cannot be easily conducted to the heat insulating package. Accordingly, the heat losses of these reactors can be reduced.

Then, the multiple reactors are contained together in one heat insulating package, thereby making it possible to miniaturize the reforming apparatus as compared with the case in which each of the multiple reactors is contained in each heat insulating package. In addition, since the multiple reactors are stacked in the heat insulating package, these reactors are made compact and the heat insulating package itself can be reduced, with the result that the reforming apparatus can be miniaturized.

In the reforming apparatus, at least one support member that supports the plurality of reactors to be spaced from one another may be disposed between adjacent reactors among the plurality of reactors.

Namely, since the reactors are supported by the support member to be separated from one another, heat conduction among the reactors is performed through the support member. Accordingly, temperature of the reactor that is in a temperature stationary state can be set according to thermal conductivity of the support member.

In the reforming apparatus, a passage hole may be formed on the support member and the internal spaces of the plurality of reactors may communicate with one another through the passage hole.

Namely, the passage hole is formed on the support member and the internal spaces of the plurality of reactors communicate with one another through the passage hole. For this reason, fuel and a by-product generated with the reaction of fuel flow among the reactors through the passage hole and the fuel and the by-product are reacted with each other by each reactor. Moreover, the fuel and the by-product flow through the passage hole of the support member without providing the pipe communicating with the internal space of each of the multiple reactors. For this reason, the reforming apparatus can be miniaturized by the amount corresponding to the pipes.

In the reforming apparatus, the plurality of reactors may include a first evaporator that evaporates a liquid mixture of fuel and water, a reformer that reforms the liquid mixture of fuel and water evaporated by the first evaporator to a gaseous mixture containing hydrogen gas, and a carbon monoxide remover that reacts carbon monoxide contained in the gaseous mixture to remove carbon monoxide. The first evaporator, the carbon monoxide remover and the reformer may be stacked in order upwardly from the heat insulator.

The reaction temperature of each reactor is set in order of decreasing temperature, reaction temperature at which hydrogen gas is generated from the fuel by the reformer, reaction temperature at which carbon monoxide is removed from the gaseous mixture by the carbon monoxide remover, and evaporation temperature at which fuel is evaporated by the first evaporator. The order in which these reactors are stacked is in order of increasing the reaction temperature, and this makes it possible to reduce the heat losses of the first evaporator, the carbon monoxide remover and the reformer.

The reforming apparatus further may further include a combustor corresponding to at least one of the plurality of reactors.

Since the reactor is heated by the combustor, the reaction can efficiently occur.

The reforming apparatus may further include a second evaporator that evaporates fuel, and three combustors that burn fuel evaporated by the second evaporator. The heat insulator, the second evaporator, the first evaporator, the first combustor and the carbon monoxide remover of three combustors, the second combustor, the reformer, and a third combustor of three combustors may be stacked in order from the lower portion.

According to this configuration, combustion heat generated by three combustors is conducted to the second evaporator, the first evaporator, the carbon monoxide remover, and the reformer, so that the second evaporator, the first evaporator, the carbon monoxide remover, and the reformer are heated.

The reforming apparatus may further include a first support member that is disposed between the second evaporator and the first evaporator to support the second evaporator and the first evaporator to be separated from each other. The reforming apparatus may further include a second support member that is disposed between the first combustor and the carbon monoxide remover to be separated from each other. The reforming apparatus may further include a third support member that is disposed between the second evaporator and the reformer to be separated from each other.

Since the support member is disposed between the second evaporator and the first evaporator, the heat conduction between the second evaporator and the first evaporator is performed through the first support member. Similarly, the heat conduction between the first combustor and the carbon monoxide remover is performed through the second support member, and the heat conduction between the second evaporator and the reformer is performed through the third support member. Accordingly, the reaction temperature of each reactor in the temperature stationary state can be set according to the heat conductivities of the first to third support members.

In the reforming apparatus, a radiation-reflecting layer may be formed on an inner wall of the heat insulating package.

In the reforming apparatus, the radiation-reflecting layer may be formed of at least one of Au, Ag, and Al.

Since an electromagnetic wave caused by radiant heat of each reactor is reflected by the radiation-reflecting layer, the radiant heat is not transmitted to the heat insulating package. Accordingly, the heat loss of each reactor can be reduced.

In the reforming apparatus, pressure of the internal space in the heat insulating package is preferably set to 1 Pa or less.

Since the internal space of the heat insulating package is a low-pressure atmosphere, no convection occurs in the internal space and heat is not transmitted from each reactor. Accordingly, the heat loss of reach reactor can be reduced.

In the reforming apparatus, the internal space of the heat insulating package may be filled with an inert gas selected from methane containing fluorine, polyhalogenated derivative gas of ethane and carbon dioxide.

Since the internal space of the heat insulating package is filled with gas such as methane containing fluorine or polyhalogenated derivative gas of ethane or carbon dioxide, heat is not easily transmitted to the heat insulating package form each reactor through the internal space. Accordingly, the heat loss of each reactor can be reduced.

In the reforming apparatus, the internal space of any one of the plurality of reactors may be partially shaped like a winding passage.

Since the internal space of the reactor is shaped like a winding passage, the ratio of the inner surface of the internal space of the reactor to the volume of the internal space of the reactor is large. Accordingly, heat is easily transmitted from each reactor by the fuel of the internal space.

In the reforming apparatus, a passage hole may be formed that leads to the internal space of the second evaporator from the passage outside the heat insulating package through the heat insulating package and the heat insulator.

A reforming apparatus that generates hydrogen from fuel includes a reformer that reforms fuel in an internal space. The reforming apparatus further includes an evaporator that evaporates fuel in the internal space. The reforming apparatus further includes a heat propagating section disposed between the reformer and the evaporator to propagate heat of the reformer to the evaporator.

According to the present invention, since heat travels from a warmer area to a cool area, the reformer that needs the highest temperature for the reaction is heated, so that the heat is propagated to the evaporator that reacts at relatively low temperature. This makes it possible for each reactor to cause a reaction with good thermal efficiency. Moreover, a heating section may be provided to only the reformer, and this can contribute to the simplification and miniaturization of the reforming apparatus. The heating section may be provided to both the reformer and the evaporator.

In the reforming apparatus, the heat propagating section may be a carbon monoxide remover.

In the reforming apparatus, at least one support member may be disposed among the reformer, the evaporator, and the heat propagating section.

In the reforming apparatus, a passage hole may be formed on the support member and the internal spaces of the reformer and the evaporator may communicate with each other through the passage hole.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

The following will explain a specific embodiment of the present invention with reference to the drawings. However, the scope of the invention is not limited to the illustrated example.

Figure 1:
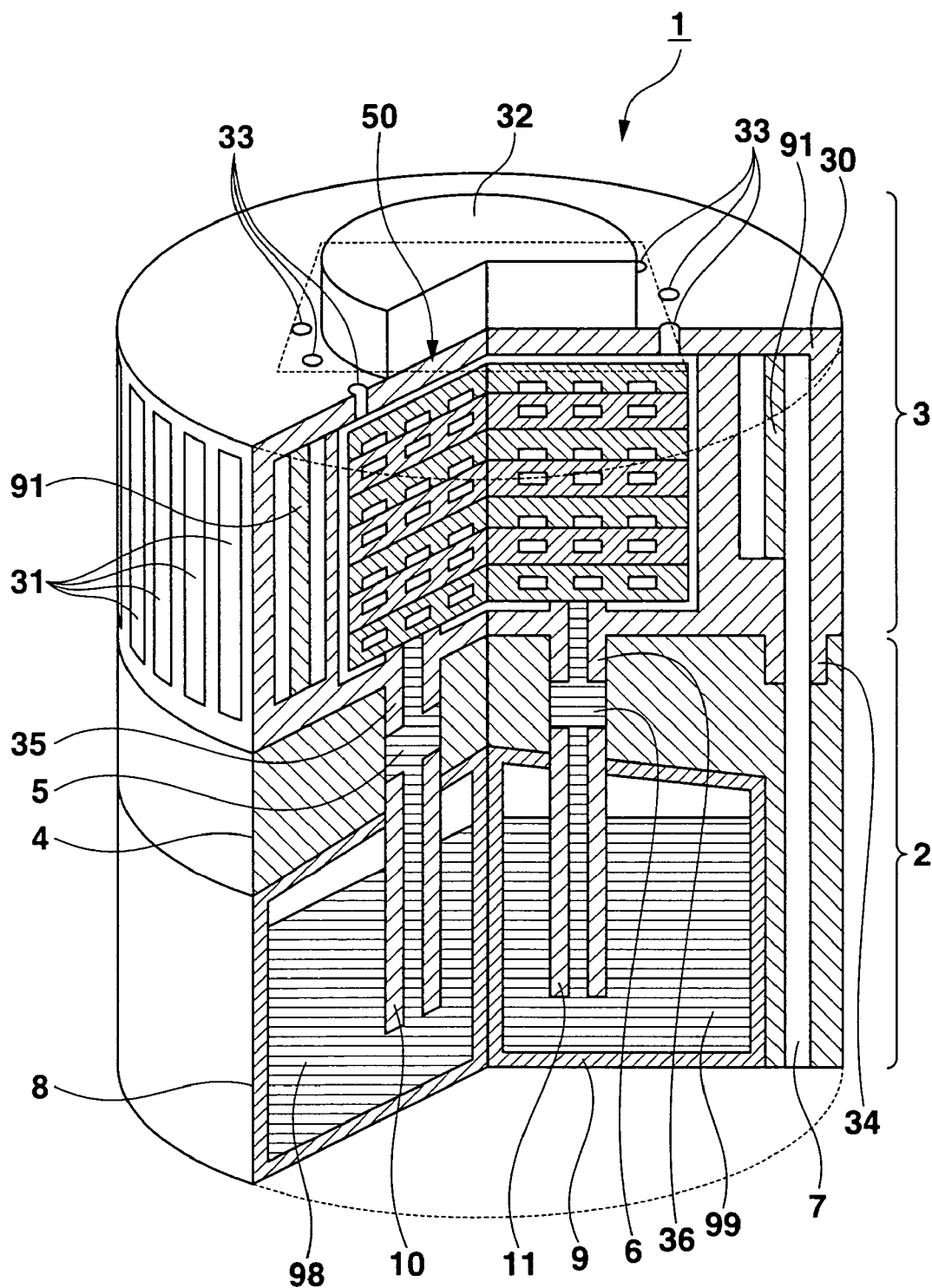
FIG. 1 is a perspective view of a fuel storage module and a power generating module partially broken away.

FIG. 1 is a perspective view of a power generating system 1 partially broken away.

As illustrated in FIG. 1, the power generating system 1 includes a fuel storage module 2 and a power generating module 3. The fuel storage module 2 stores a combustion fuel 98 and a power generating fuel 99. The power generating module 3 has a built-in small size reforming apparatus 50 to which the present invention is applied and which is called micro reactor, and generates power using the combustion fuel 98 and the power generating fuel 99 stored in the fuel module 2.

The fuel module 2 has a substantially cylindrical enclosure 4 and the enclosure 4 is attached to the power generating module 3 to be freely detachable therefrom. Two circular through holes 5 and 6 are formed on a head portion of the enclosure 4. A first drainage pipe 7 is provided on an outer peripheral side of the enclosure 4. The first drainage pipe 7 circulates water of a by-product generated by the power generating module 3. A drainage vessel 15 (FIG. 2), which stores water for drainage, is formed on a bottom of the fuel module 2. The first drainage pipe 7 is connected to the drainage vessel 15.

Two fuel tanks 8 and 9 are contained in the interior of the enclosure 4, and the outer peripheral surfaces of the fuel tanks 8 and 9 are partially exposed to the outside of the enclosure 4. These fuel tanks 8 and 9 are formed of a transparent or semi-transparent member having an internal space, namely, material such as polyethylene, polypropylene, polycarbonate, acryl, and the like.

The liquid combustion fuel 98 is stored in the interior of the first fuel tank 8, and the liquid power generating fuel 99 is stored in the interior of the second fuel tank 9. The liquid combustion fuel 98 is a liquid chemical fuel, and alcohol such as methanol, ethanol and the like and a compound containing hydrogen such as gasoline can be applied. Moreover, the liquid power generating fuel 99 is a liquid mixture of the liquid chemical fuel and water, and alcohol such as methanol, ethanol and the like and a compound containing hydrogen such as gasoline can be applied as a chemical fuel. In this embodiment, methanol is used as the liquid combustion fuel 98 and the liquid mixture in which methanol and water are mixed with equal mole fraction is used as the liquid power generating fuel 99.

Since the fuel tanks 8 and 9 are partially exposed and they are transparent or semi-transparent, the presence or absence of the internal combustion fuel 98 and power generating fuel 9 and the residual quantity thereof can be easily checked through the fuel tanks 8 and 9, respectively.

In the interior of the first fuel tank 8, there is provided a first supply pipe 10 for supplying the combustion fuel 98 to the power generating module 3. The first supply pipe 10 projects to the outside of the first fuel tank 8 from the interior of the first fuel tank 8 through the head portion of the first fuel tank 8, and is inserted into the through hole 5 of the enclosure 4. A block film (not shown), which is provided in the through hole 5 and above the first supply pipe 10, blocks the through hole 5, so that the combustion fuel 98 is prevented from leaking outside from the first fuel tank 8 by the block film.

In the interior of the first fuel tank 9, there is provided a second supply pipe 11 for supplying the power generating fuel 99 to the power generating module 3. The second supply pipe 11 projects to the outside of the second fuel tank 9 from the interior of the second fuel tank 9 through the head portion of the second fuel tank 9, and is inserted into the through hole 6 of the enclosure 4. A block film (not shown), which is provided in the through hole 6 and above the second supply pipe 11, blocks the through hole 6, so that the power generating fuel 99 is prevented from leaking outside from the second fuel tank 9 by the block film.

The power generating module 3 will be next explained.

The power generating module 3 includes a substantially cylindrical enclosure 30, a small size reforming apparatus 50 provided in the interior of the enclosure 30, and a fuel cell 91 provided around the small size reforming apparatus 50 and on an outer peripheral surface side of the enclosure 30.

At the outside of the fuel cell 91 and on the outer peripheral surface of the enclosure 30, a plurality of slits 31, 31, . . . for sucking oxygen in the air is formed in a state that they are arranged in parallel to one another.

On the head portion of the enclosure 30, there is provided a terminal 32 for supplying electric energy to the external device, and a plurality of air holes 33, 33, . . . are formed around the terminal 32 and on the head portion of the enclosure 30.

A second drainage pipe 34 is provided on the outer peripheral side of the enclosure 30. The second drainage pipe 34 projects downward from the bottom of the enclosure 30 and is placed at the position corresponding to the first drainage pipe 7 of the fuel storage module 2. The second drainage pipe 34 circulates water of the by-product generated by the power generating module 3.

At the bottom of the enclosure 30 and its central portion, a first suction nipple portion 35 and a second suction nipple portion 36 are provided to project downward. Each of the first suction nipple portion 35 and the second suction nipple portion 36 has a passage passing along a central line from the tip portion. The first suction nipple portion 35 is placed at the position corresponding to the through hole 5 of the fuel storage module 2 and sucks the combustion fuel 98 from the first fuel tank 8. The second suction nipple portion 36 is placed at the position corresponding to the through hole 6 of the fuel storage module 2 and sucks the power generating fuel 99 from the second fuel tank 9.

In the aforementioned fuel storage module 2 and power generating module 3, when the fuel storage module 2 containing the fuel tanks 8 and 9 is connected to the power generating module 3, the second drainage pipe 34 of the power generating module 3 is connected to the first drainage pipe 7 of the fuel storage module 2 at the outer peripheral side of the connecting portion of both modules 2 and 3. As a result, the second drainage pipe 34 communicates with the first drainage pipe 7 to circulate water of the by-product generated by the generating module 3 to the first drainage pipe 7 from the second drainage pipe 34 to make it possible to be discharged to the drainage vessel 15.

Moreover, when the fuel storage module 2 is connected to the power generating module 3, the first suction nipple portion 35 of the power generating module 3 is inserted into the through hole 5 of the fuel storage module 2 to break through the block film provided in the through hole 5 at the central portion of the connecting portion of both modules 2 and 3. As result, the first suction nipple portion 35 communicates with the first supply pipe 10 of the first fuel tank 8 to make it possible to supply the combustion fuel 98 stored in the first fuel tank 8 to the first suction nipple portion 35 from the first supply pipe 10.

Moreover, the second suction nipple portion 36 of the power generating module 3 is inserted into the through hole 6 of the fuel storage module 2 to break through the block film provided in the through hole 6. As a result, the second suction nipple portion 36 communicates with the second supply pipe 11 of the second fuel tank 9 to make it possible to supply the power generating fuel 99 stored in the second fuel tank 9 to the second suction nipple portion 36 from the second supply pipe 11.

Figure 2:
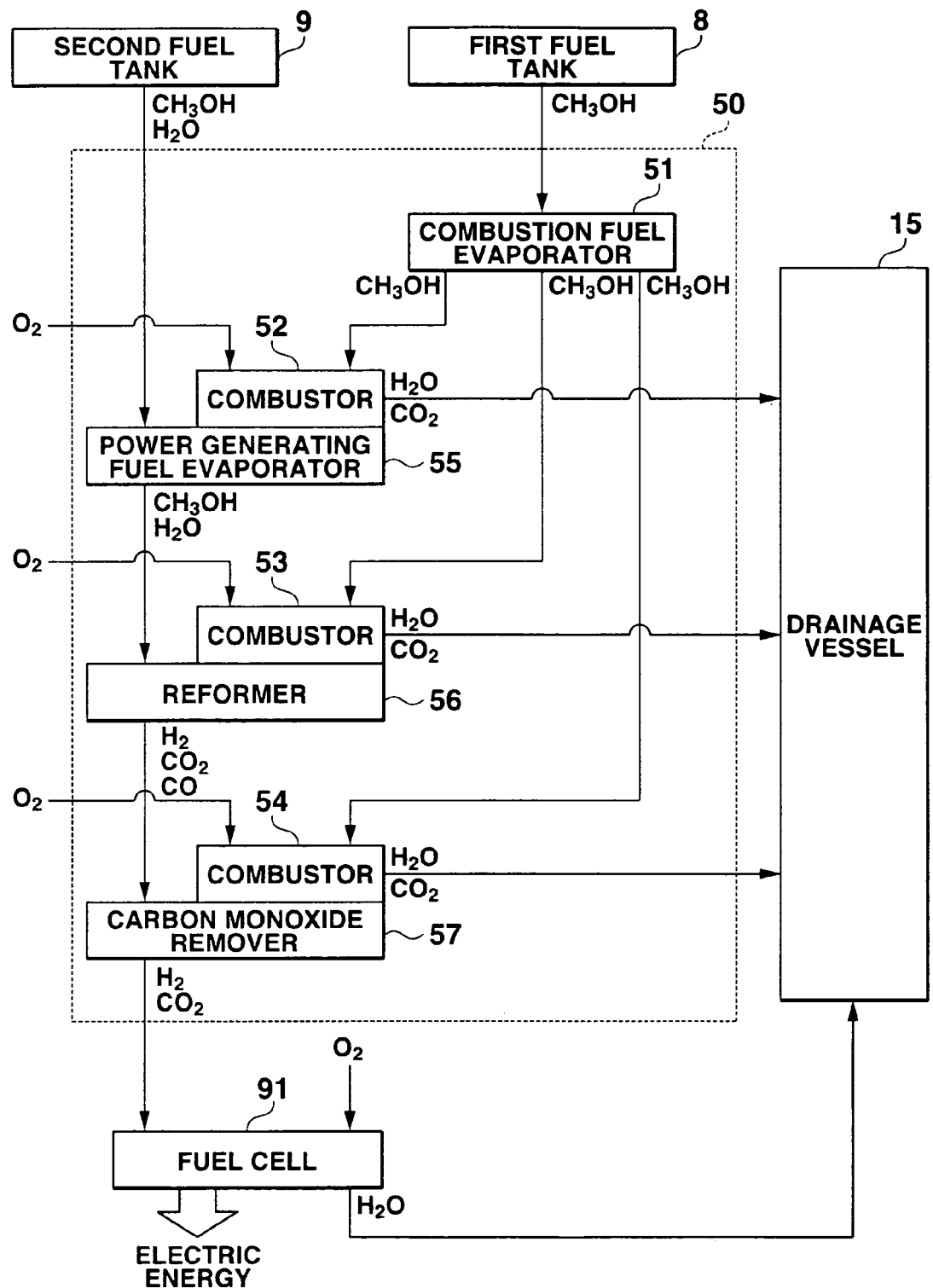
FIG. 2 is a block diagram illustrating a basic configuration of a power generating system.
Figure 3:
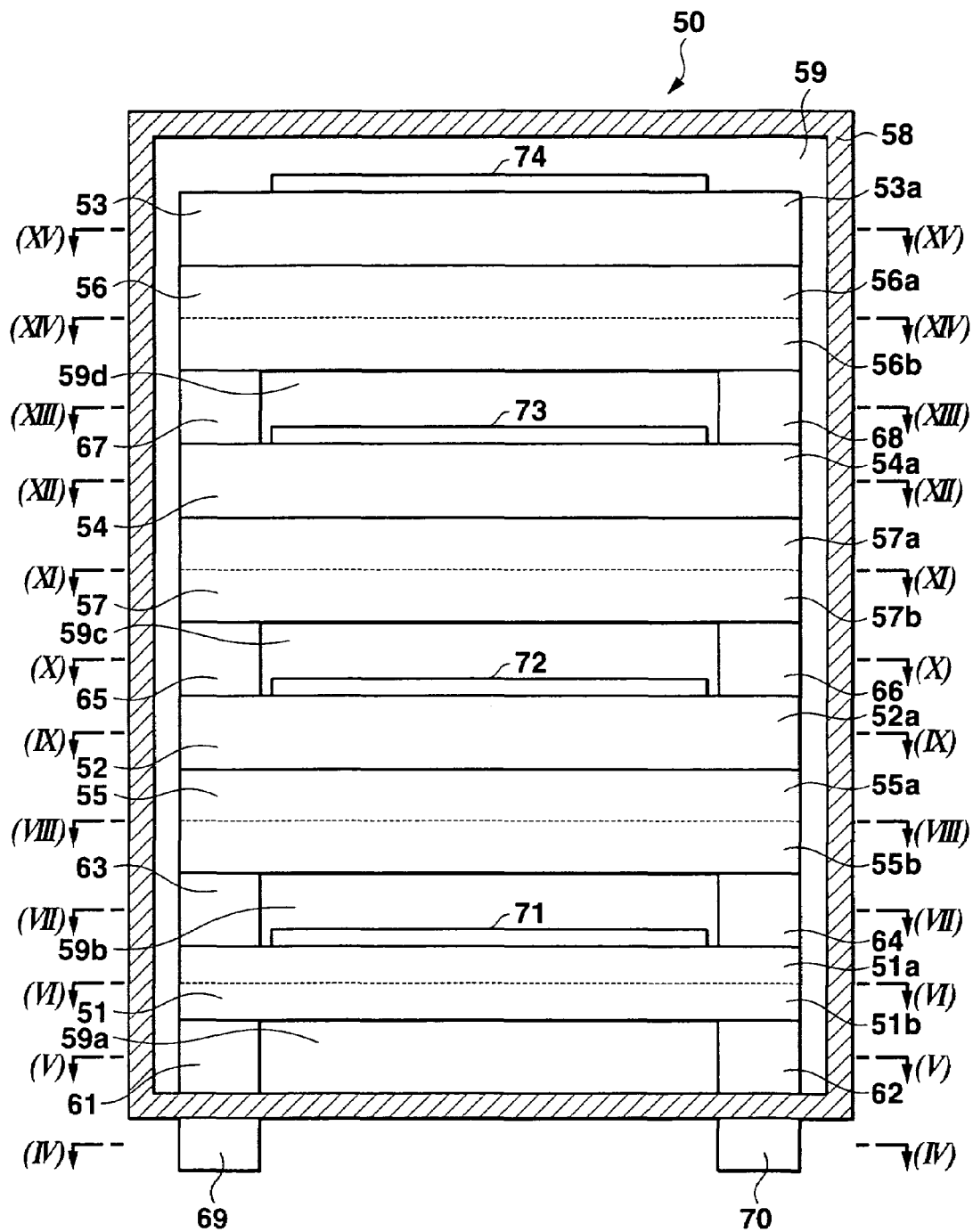
FIG. 3 is a side view of a small size reforming apparatus partially broken away.

An explanation will be next given of the small size reforming apparatus 50 built in the power generating module 3 using FIGS. 2 to 15. Here, FIG. 2 is a block diagram illustrating a configuration of the power generating system 1, and FIG. 3 is a side view of the small size reforming apparatus 50 that is partially broken away. FIGS. 4 to 15 are cross-sectional views broken away on broken lines IV-IV to XV-XV of FIG. 3 in order.

As illustrated in FIGS. 2 and 3, the small size reforming apparatus 50 includes combustion fuel evaporator 51, combustors 52, 53, 54, a power generating fuel evaporator 55, a reformer 56, a carbon monoxide remover 57, and a heat insulating package 58 containing these combustion fuel evaporator 51, combustors 52, 53, 54, power generating fuel evaporator 55, reformer 56, and carbon monoxide remover 57. The combustion fuel evaporator 51 evaporates the combustion fuel 98 supplied from the first fuel tank 8. The combustors 52, 53, 54 oxidize the combustion fuel 98 evaporated by the combustion fuel evaporator 51 and burn it. The power generating fuel evaporator 55 evaporates the power generating fuel 99 supplied from the second fuel tank 9. The reformer 56 reforms the power generating fuel 99 evaporated by the power generating fuel evaporator 55 to hydrogen gas and carbon dioxide gas. The carbon monoxide remover 57 removes carbon monoxide contained in the gaseous mixture supplied from the reformer 56 and detoxicates the gaseous mixture. In addition, the heat insulating package 58 is illustrated in a cutaway manner in FIG. 3.

The heat insulating package 58 is shaped like a rectangular or cubic box having an inner space 59. The heat insulating package 58 is formed of heat insulating material with relatively low thermal conductivity such as glass, ceramic or metal. The inner space 59 of the heat insulating package 58 is in atmosphere of 1 Pa (Pascal) or less or filled with methane containing fluorine or polyhalogenated derivative gas of ethane (Freon (trade name) gas) and carbon dioxide. As methane containing fluorine or polyhalogenated derivative gas of ethane, trichlorofluoromethane, dichlorofluoromethane and the like can be used.

Furthermore, on an inner wall of the heat insulating package 58, a radiation-reflecting layer formed of at least one of Au, Ag, and Al is filmed, and the radiation-reflecting layer has high reflectivity to an electromagnetic wave. Since the radiation-reflecting layer is formed on the inner wall of the heat insulating package 58, the electromagnetic wave emitted at the inner space 59 of the heat insulating package 58 is reflected by the radiation-reflecting layer, so that the electromagnetic wave is little transmitted outside the heat insulating package 58 and heat radiation can be suppressed.

Figure 4:
FIG. 4 is a cross-sectional view broken away on a broken line IV-IV of FIG. 3.

Support members 69 and 70 are joined onto an outer wall lower surface of the heat insulating package 58 and left and right end portions of FIG. 3. The heat insulating package 58 is supported by the support members 69 and 70. The support members 69 and 70 are formed of heat insulating material with relatively low thermal conductivity such as glass and ceramic. Then, as illustrated in FIG. 4, in the support member 69, three passage holes 82, 84, and 86 passing up and down are formed for piping, and in the support member 70, four passage holes 75, 77, 79, and 81 passing up and down are formed for piping.

Figure 6:
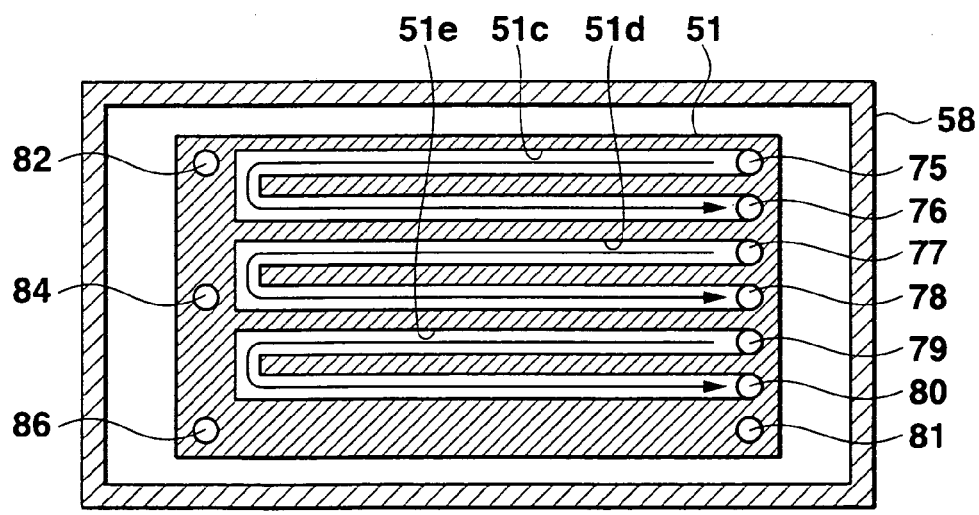
FIG. 6 is a cross-sectional view broken away on a broken line VI-VI of FIG. 3.

The combustion fuel evaporator 51 contained in the heat insulating package 58 has a structure in which two substrates 51a and 51b formed of material such as silicon crystal, aluminum, glass, and the like are placed one on top of the other to be joined to each other. Then, as illustrated in FIG. 6, in the joined portion of the substrates 51a and 51b, three U-shape or winding micro passages 51c, 51d, and 51e are formed as internal spaces. The height of each of the micro passages 51c, 51d, and 51e is 500 μm or less and the width thereof is 500 μm or less.

Though the details are given later, one end portion of the micro passage 51c leads to a passage hole 75, and the other end portion of the micro passage 51c leads to a passage hole 76. One end portion of the micro passage 51d leads to a passage hole 77, and the other end portion of the micro passage 51d leads to a passage hole 78. One end portion of the micro passage 51e leads to a passage hole 79, and the other end portion of the micro passage 51e leads to a passage hole 80.

The micro passages 51c, 51d, and 51e are formed in such a manner that three winding (or U-shape) grooves formed on one surface of the substrate 51a are faced to three winding (or U-shape) grooves formed on surface of the substrate 51b to join the substrate 51a and the substrate 51b. The grooves formed on the substrate 51a are symmetrical to the grooves formed on the substrate 51b with reference with the joined surface, so that the substrates 51a and 51b are joined to form the micro passages 51c, 51d, and 51e. The grooves as the micro passages 51c, 51d, and 51e are formed by appropriately providing a photolithography method, an etching method and the like to one surface of the substrate 51a and one surface of the substrate 51b. Additionally, though the details are given later, the combustion fuel 98 is evaporated when flowing in the micro passages 51c, 51d, and 51e. The evaporation of the combustion fuel 98 efficiently occurs at temperature of 80° C. to 120° C.

Additionally, as illustrated in FIG. 3, a heater 71, which generates heat by electric energy to heat the combustion fuel evaporator 51, may be joined to an upper surface of the combustion fuel evaporator 51, namely, an upper surface of the substrate 51a.

Figure 5:
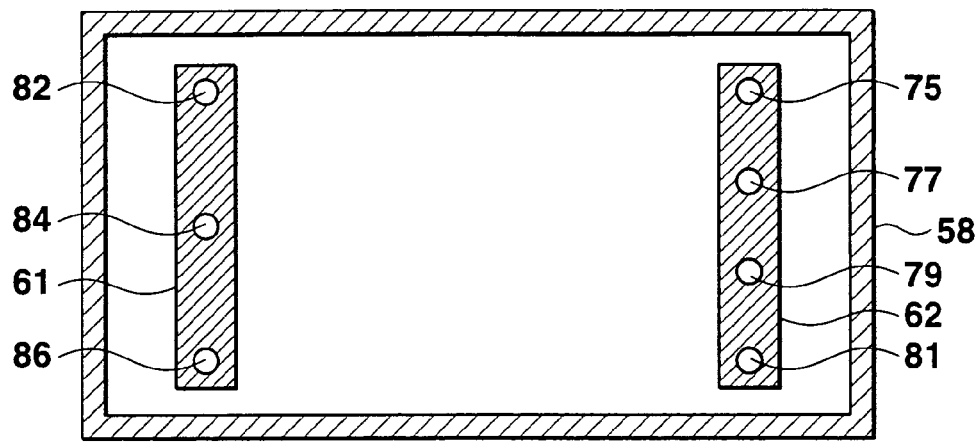
FIG. 5 is a cross-sectional view broken away on a broken line V-V of FIG. 3.

Two heat insulating support members 61 and 62 are joined onto a lower surface of the combustion fuel evaporator 51, namely, a lower surface of the substrate 51b and the left and right end portions. The lower surfaces of the heat insulating support members 61 and 62 are joined onto an inner wall bottom surface of the heat insulating package 58. The combustion fuel evaporator 51 is supported by the heat insulating support members 61 and 62 to be separated from the inner wall of the heat insulating package 58 by forming a space 59a between the evaporator 51 and the inner wall of the heat insulating package 58. As viewing in plane, namely, seeing the small size reforming apparatus 50 from the top, the heat insulating support member 61 is overlapped with the support member 69 and the heat insulating support member 62 is overlapped with the support member 70. The heat insulating support members 61 and 62 are formed of heat insulating material with relatively low thermal conductivity such as glass and ceramic. As illustrated in FIG. 5, in the heat insulating support member 61, three passage holes 82, 84, and 86 passing up and down are formed for piping, and in the heat insulating support member 62, four passage holes 75, 77, 79, and 81 passing up and down are formed for piping.

Figure 7:
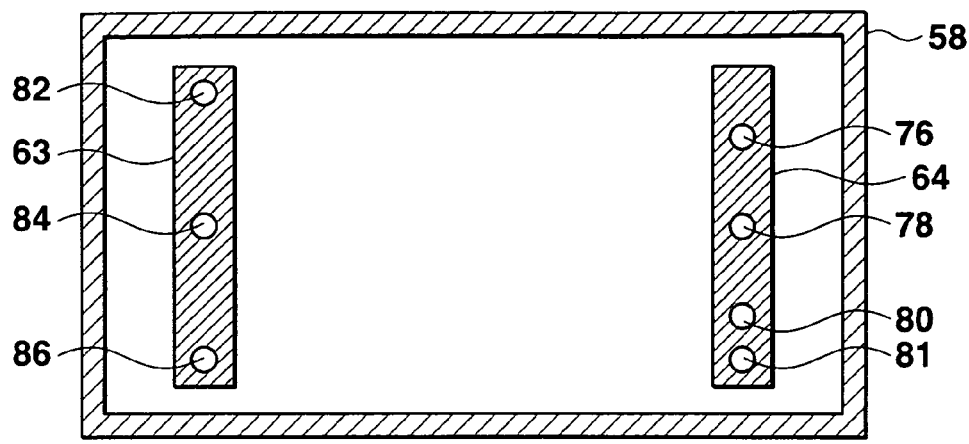
FIG. 7 is a cross-sectional view broken away on a broken line VII-VII of FIG. 3.

As illustrated in FIG. 3, two support members 63 and 64 that support the power generating fuel evaporator 55 are joined onto an upper surface of the combustion fuel evaporator 51, namely, the left and right end portions to be separated from the inner wall of the heat insulating package 58. These support members 63 and 64 are formed of heat insulating material with relatively low thermal conductivity such as glass and ceramic. As seeing the small size reforming apparatus 50 from the top, the support member 63 is overlapped with the heat insulating support member 61 and the support member 64 is overlapped with the heat insulting support member 62. As illustrated in FIG. 7, in the support member 63, three passage holes 82, 84, and 86 passing up and down are formed for piping, and in the support member 64, four passage holes 76, 78, 80, and 81 passing up and down are formed for piping.

Figure 8:
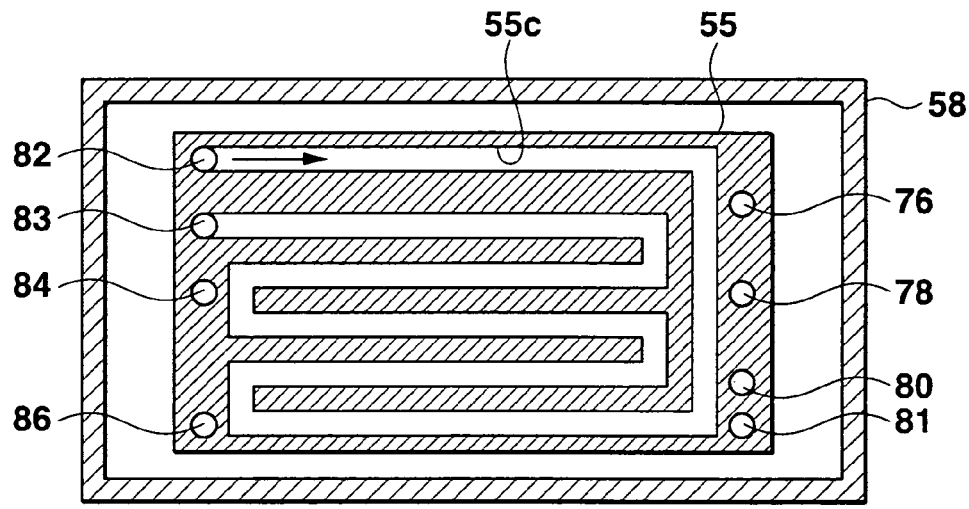
FIG. 8 is a cross-sectional view broken away on a broken line VIII-VIII of FIG. 3.

As illustrated in FIG. 3, the power generating fuel evaporator 55 is installed on the support members 63 and 64 to be separated from the inner wall of the heat insulating package 58. The power generating fuel evaporator 55 has a structure in which two substrates 55a and 55b formed of material such as silicon crystal, aluminum, glass, and the like are placed one on top of the other to be joined to each other. Then, as illustrated in FIG. 8, in the joined portion of the substrates 55a and 55b, a winding micro passage 55c is formed as an internal space. The height of the micro passage 55c is 500 μm or less and the width thereof is 500 μm or less. Though the details are given later, one end portion of the micro passage 55c leads to a passage hole 82, and the other end portion of the micro passage 55c leads to a passage hole 83.

The micro passages 55c is formed in such a manner that the substrate 55a and substrate 55b, each having a winding groove formed by the photolithography method, etching method and the like, are prepared and their grooves are faced to each other to join the substrate 55a to the substrate 55b, similar to the micro passage 51c of the combustion fuel evaporator 51. Though the details are given later, the power generating fuel 99 is evaporated when flowing in the micro passage 55c. The evaporation of the power generating fuel 99 efficiently occurs at temperature of 100° C. to 150° C.

As illustrated in FIG. 3, the support members 63 and 64 are joined onto a lower surface of the power generating fuel evaporator 55, namely, a lower surface of the substrate 55b and the left and right end portions. A space 59b is formed between the power generating fuel evaporator 55 and the combustion fuel evaporator 51, so that the power generating fuel evaporator 55 is separated from the combustion fuel evaporator 51.

Figure 9:
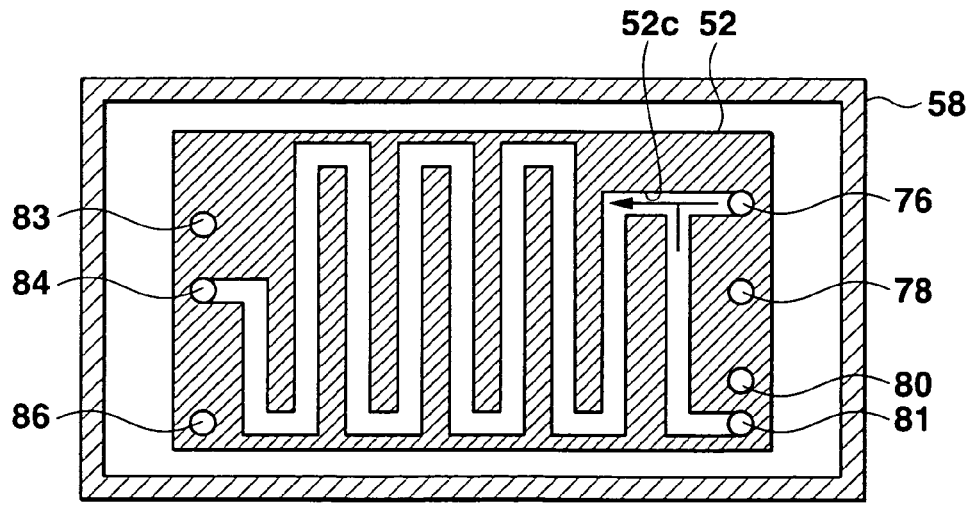
FIG. 9 is a cross-sectional view broken away on a broken line IX-IX of FIG. 3.

The combustor 52 that heats the power generating fuel evaporator 55 is installed on an upper surface of the power generating fuel evaporator 55, namely, an upper surface of the substrate 55a to be separated from the inner wall of the heat insulating package 58. As illustrated in FIG. 9, in the interior of the combustor 52, a winding micro passage 52c is formed as an internal space, and the micro passage 52c is divided and three end portions are formed therein. The height of the micro passage 52c is 500 μm or less and the width thereof is 500 μm or less. Though the details are given later, among three end portions, the first end portion leads to the passage hole 76, the second end portion leads to the passage hole 82, and the third end portion leads to the passage hole 84.

The micro passages 52c is formed in such a manner that the substrate 52a, having a winding groove formed by the photolithography method, etching method and the like, is prepared and the substrate 55a is joined to the substrate 52a in a state that the groove of the substrate 52a is directed to the substrate 55a of the power generating fuel evaporator 55. Here, the groove formed on the substrate 52a becomes the micro passage 52c. Though the details are given later, the evaporated combustion fuel 98 is oxidized and burned when flowing in the micro passage 52c.

In addition, as illustrated in FIG. 3, a heater 72 that heats the combustor 52 may be joined onto the upper surface of the combustor 52, namely, the upper surface of the substrate 52a. Further, combustion catalyst is adhered onto the inner wall of the micro passage 52c, so that the evaporated combustion fuel 98 may be oxidized with combustion catalyst and burned.

Figure 10:
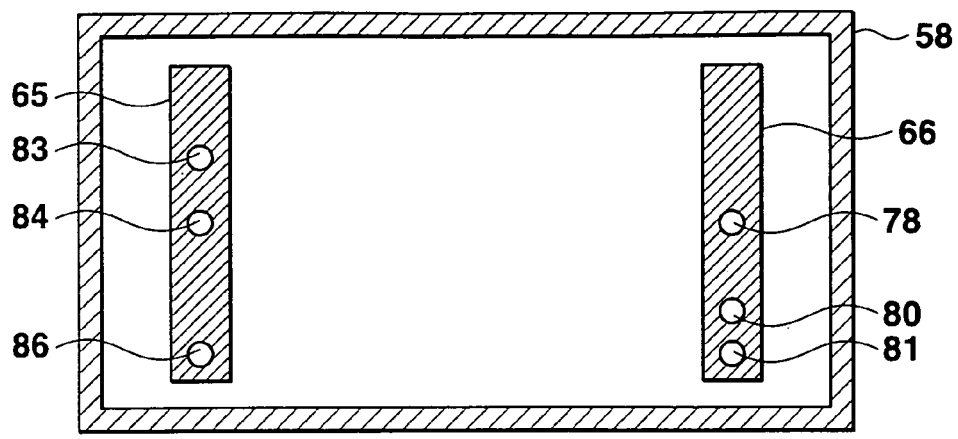
FIG. 10 is a cross-sectional view broken away on a broken line X-X of FIG. 3.
Figure 11:
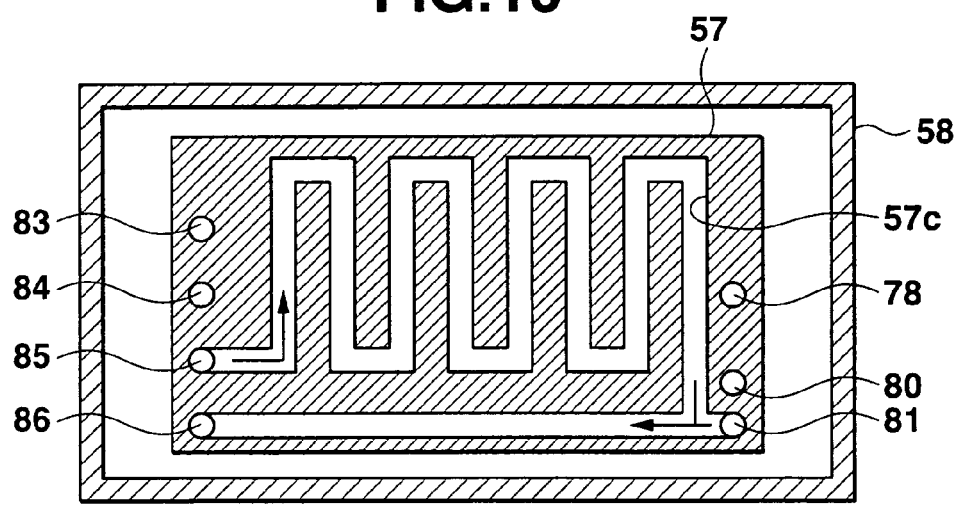
FIG. 11 is a cross-sectional view broken away on a broken line XI-XI of FIG. 3.

Moreover, two support members 65 and 66 that support the carbon monoxide remover 57 are joined onto an upper surface of the combustor 52 and the left and right end portions to be separated from the inner wall of the heat insulating package 58. The support members 65 and 66 are formed of heat insulating material with relatively low thermal conductivity such as glass and ceramic. As seeing the small size reforming apparatus 50 from the top, the support member 65 is overlapped with the support member 63 and the support member 66 is overlapped with the support member 64. As illustrated in FIG. 10, in the support member 65, three passage holes 83, 84, and 86 passing up and down are formed for piping, and in the support member 66, three passage holes 78, 80, and 81 passing up and down are formed for piping.

As illustrated in FIG. 3, the carbon monoxide remover 57 is installed on the support members 65 and 66 to be separated from the inner wall of the heat insulating package 58. The carbon monoxide remover 57 has a structure in which two substrates 57a and 57b formed of material such as silicon crystal, aluminum, glass, and the like are placed one on top of the other to be joined to each other. Then, as illustrated in FIG. 1, in the joined portion of the substrates 57a and 55b, a winding micro passage 57c is formed as an internal space. The micro passage 57c is divided and three end portions are formed therein. The height of the micro passage 57c is 500 μm or less and the width thereof is 500 μm or less. Though the details are given later, among three end portions of the micro passage 57c, the first end portion leads to the passage hole 85, the second end portion leads to the passage hole 81, and the third end portion leads to the passage hole 86.

The micro passages 57c is formed in such a manner that the substrate 57a and substrate 57b, each having a winding groove formed by the photolithography method, etching method and the like are prepared, and their grooves are faced to each to join the substrate 57a and substrate 57b to each other, similar to the micro passage 51c of the combustion fuel evaporator 51. Moreover, a water shift reaction application catalyst film and a selective oxidation reaction application catalyst film are formed on the inner wall of the micro passage 57c.

The water shift reaction application catalyst accelerates a reaction of carbon monoxide with water to generate carbon dioxide and hydrogen as in the following chemical reaction formula (1). Since the water shift reaction of chemical reaction formula (1) is an exothermic reaction, the combustor 54 is not always needed. However, since the carbon monoxide remover 57 has a function of transmitting heat to the power generating fuel evaporator 55 provided downward, the carbon monoxide remover 57 must be heated to 120° C. to 200° C. For this reason, the combustor 54 and a heater 73 may be provided. Moreover, at least one of the combustor 54 and the heater 73 may not be provided for the purpose of high density assembly.

$$CO + H_2O \rightarrow CO_2 + H_2 \tag{1}$$

The water shift reaction application catalyst film is formed on the micro passage 57c mainly ranging from the passage hole 85 to the divided portion The selective oxidation reaction application catalyst selects carbon monoxide in the gaseous mixture and accelerates a reaction of carbon monoxide with oxygen to generate carbon dioxide as in the following chemical reaction formula (2). Since the selective oxidation reaction of chemical reaction formula (2) is an exothermic reaction, the combustor 54 is not always needed. However, since the carbon monoxide remover 57 has a function of transmitting heat to the power generating fuel evaporator 55 provided downward, the carbon monoxide remover 57 must be heated to 120° C. to 200° C. For this reason, the combustor 54 and the heater 73 may be provided. Moreover, at least one of the combustor 54 and the heater 73 may not be provided for the purpose of high density assembly.

$$2CO + O \rightarrow 2CO_2 \tag{2}$$

The selective oxidation reaction application catalyst film is formed on the micro passage 57c mainly ranging from the divided portion to the passage hole 86.

As illustrated in FIG. 3, the support members 63 and 64 are joined onto a lower surface of the carbon monoxide remover 57, namely, a lower surface of the substrate 57b and the left and right end portions. A space 59c is formed between the power generating fuel evaporator 55 and the combustor 52, so that the carbon monoxide remover 57 is separated from the combustion 52.

Figure 12:
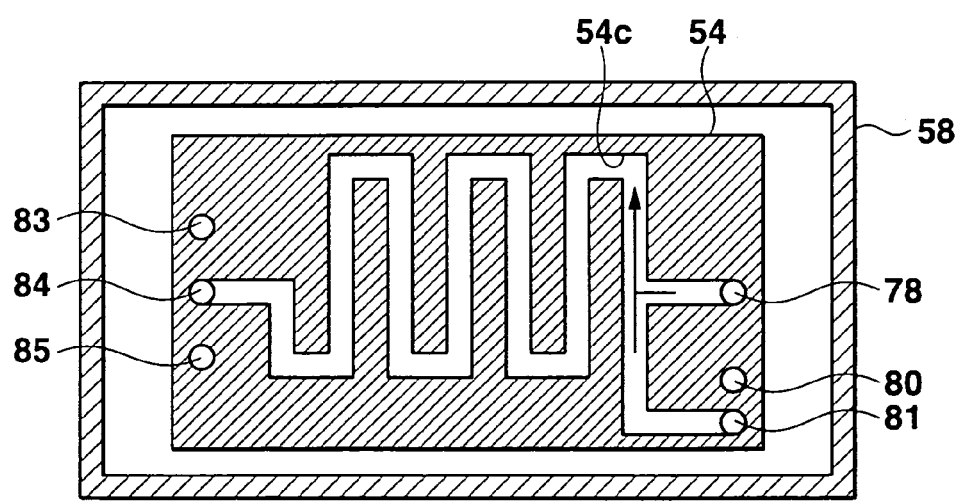
FIG. 12 is a cross-sectional view broken away on a broken line XII-XII of FIG. 3.

The combustor 54 that heats the carbon monoxide remover 57 is installed on an upper surface of the carbon monoxide remover 57, namely, an upper surface of the substrate 57a to be separated from the inner wall of the heat insulating package 58. Then, as illustrated in FIG. 12, in the interior of the combustor 54, a winding micro passage 54c is formed as an internal space. The height of the micro passage 54c is 500 μm or less and the width thereof is 500 μm or less. The micro passage 54c is divided and three end portions are formed therein. Though the details are given later, among three end portions of the micro passage 54c, the first end portion leads to the passage hole 78, the second end portion leads to the passage hole 81, and the third end portion leads to the passage hole 84.

The micro passage 54c is formed in such a manner that the substrate 54a, having a winding groove formed by the photolithography method, etching method and the like, is prepared and the substrate 54a is joined to the substrate 54a in a state that the groove of the substrate 54a is directed to the substrate 55a of the power generating fuel evaporator 55. Though the details are given later, the evaporated combustion fuel 98 is oxidized and burned when flowing in the micro passage 54c.

In addition, as illustrated in FIG. 3, the heater 73 that heats the combustor 54 may be joined onto the upper surface of the combustor 54, namely, the upper surface of the substrate 54a. Further, combustion catalyst is adhered onto the inner wall of the micro passage 54c, so that the evaporated combustion fuel 98 may be oxidized with combustion catalyst and burned.

Figure 13:
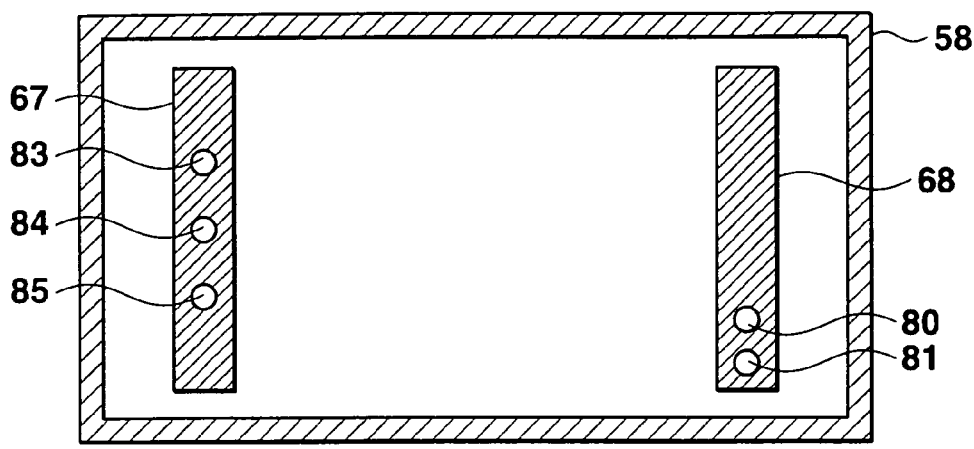
FIG. 13 is a cross-sectional view broken away on a broken line XIII-XIII of FIG. 3.

Moreover, two support members 67 and 68 that support the reformer 56 are joined onto an upper surface of the combustor 54 and the left and right end portions to be separated from the inner wall of the heat insulating package 58. As seeing the small size reforming apparatus 50 from the top, the support member 67 is overlapped with the support member 65 and the support member 68 is overlapped with the support member 66. The support members 67 and 68 are formed of heat insulating material with relatively low thermal conductivity such as glass and ceramic. Then, as illustrated in FIG. 13, in the support member 67, three passage holes 83, 84, and 85 passing up and down are formed for piping, and in the support member 68, two passage holes 80, and 81 passing up and down are formed for piping.

Figure 14:
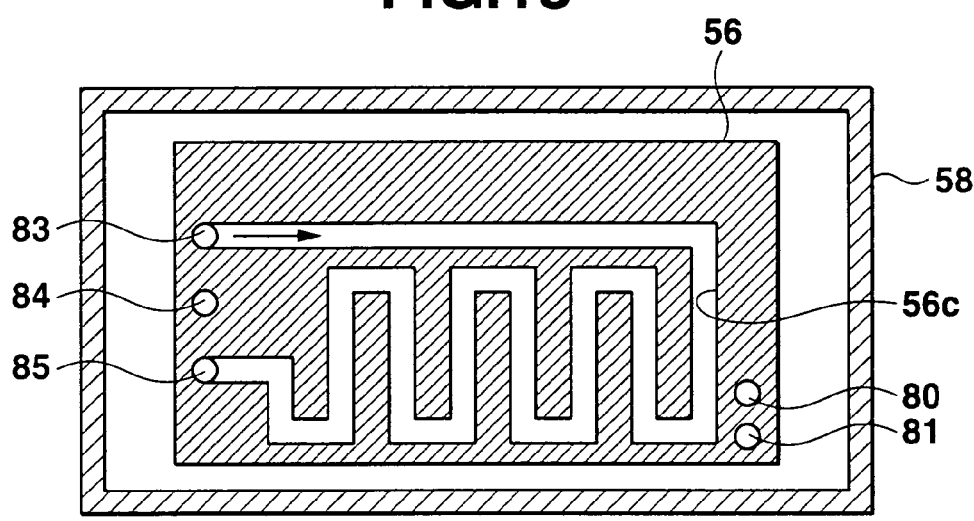
FIG. 14 is a cross-sectional view broken away on a broken line XIV-XIV of FIG. 3.

As illustrated in FIG. 3, the reformer 56 is installed on the support members 67 and 68 to be separated from the inner wall of the heat insulating package 58. The reformer 56 has a structure in which two substrates 56a and 56b formed of material such as silicon crystal, aluminum, glass, and the like are placed one on top of the other to be joined to each other. Then, as illustrated in FIG. 14, in the joined portion of the substrates 56a and 56b, a winding micro passage 56c is formed as an internal space. The height of the micro passage 56c is 500 μm or less and the width thereof is 500 μm or less. Though the details are given later, one end portion of the micro passage 56c leads to the passage hole 83, and the end portion of the micro passage 56c leads to the passage hole 85.

The micro passages 56c is formed in such a manner that the substrate 56a and substrate 56b, each having a winding groove formed by the photolithography method, etching method and the like, are prepared and their grooves are faced to each to join the substrate 56a and substrate 56b to each other, similar to the micro passage 51c of the combustion fuel evaporator 51. Moreover, a reforming reaction application catalyst film is formed on the inner wall of the micro passage 56c.

The reforming reaction application catalyst accelerates a reaction of methanol with water to generate carbon dioxide and hydrogen as in the following chemical reaction formula (3). The reforming reaction of chemical reaction formula (3) is an exothermic reaction and efficiently occurs at 200° C. to 300° C.

$$CH_3OH+H_2O \rightarrow 3H_2+CO_2 \quad (3)$$

As illustrated in FIG. 3, the support members 67 and 68 are joined onto a lower surface of the reformer 56, namely, a lower surface of the substrate 56b and the left and right end portions. A space 59d is formed between the reformer 56 and the combustor 54 to be separated from the combustion 54.

Figure 15:
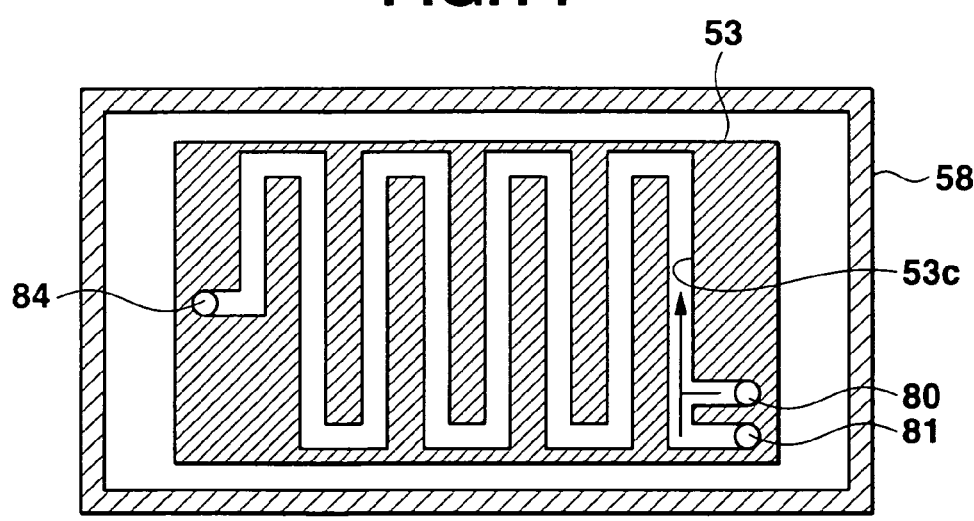
FIG. 15 is a cross-sectional view broken away on a broken line XV-XV of FIG. 3.

The combustor 53 that heats the reformer 56 is installed on an upper surface of the reformer 56, namely, an upper surface of the substrate 56a to be separated from the inner wall of the heat insulating package 58. Then, as illustrated in FIG. 15, in the interior of the combustor 53, a winding micro passage 53c is formed as an internal space. The height of the micro passage 53c is 500 μm or less and the width thereof is 500 μm or less. Moreover, the micro passage 53c is divided and three end portions are formed therein. Though the details are given later, among three end portions of the micro passage 53c, the first end portion leads to the passage hole 80, the second end portion leads to the passage hole 81, and the third end portion leads to the passage hole 84.

The micro passage 53c is formed in such a manner that the substrate 53a, having a winding groove formed by the photolithography method, etching method and the like, is prepared and the substrate 53a is joined to the substrate 56a in a state that the groove of the substrate 53a is directed to the substrate 56a of the reformer 56. Though the details are given later, the evaporated combustion fuel 98 is oxidized and burned when flowing in the micro passage 54c. In addition, combustion catalyst is adhered onto the inner wall of the micro passage 53c, so that the evaporated combustion fuel 98 may be oxidized with combustion catalyst and burned.

As illustrated in FIG. 3, a heater 74 that heats the combustor 53 is joined onto the upper surface of the combustor 53, namely, the upper surface of the substrate 53a. As the heater 74, an electric resistance heating element and a semiconductor heating element can be cited. However, any device may be possible if the device is one that generates heat by electric energy caused when current flows or voltage is applied.

An explanation will be next given of the passage holes 75 to 86 formed for piping.

The passage hole 75 leads to one end portion of the micro passage 51c formed in the combustion fuel evaporator 51 through the support member 70, the heat insulating package 58 and the heat insulating support member 62 from the lower end of the support member 70. Moreover, the passage of the first suction nipple portion 35 leads to the passage hole 75. A pump is provided between the first suction nipple portion 35 and the passage hole 75. The combustion fuel 98 is supplied to the passage hole 75 from the first fuel tank 8 by the pump.

The passage hole 76 leads to the first end portion of the micro passage 52c formed in the combustor 52 through the support member 64 and the power generating fuel evaporator 55 from the other end portion of the micro passage 51c.

The passage hole 77 leads to one end portion of the micro passage 51d formed in the combustion fuel evaporator 51 through the support member 70, the heat insulating package 58 and the heat insulating support member 62 from the lower end of the support member 70. Moreover, the passage of the first suction nipple portion 35 leads to the passage hole 77. A pump is provided between the first suction nipple portion 35 and the passage hole 77. The combustion fuel 98 is supplied to the passage hole 75 from the first fuel tank 8 by the pump.

The passage hole 78 leads to the first end portion of the micro passage 54c formed in the combustor 54 through the support member 64, the power generating fuel evaporator 55, the combustor 52, the support member 66, and the carbon monoxide remover 57 from the other end portion of the micro passage 51d.

The passage hole 79 leads to one end portion of the micro passage 51e formed in the combustion fuel evaporator 51 through the support member 70, the heat insulating package 58 and the heat insulating support member 62 from the lower end of the support member 70. Moreover, the passage of the first suction nipple portion 35 leads to the passage hole 79. A pump is provided between the first suction nipple portion 35 and the passage hole 77. The combustion fuel 98 is supplied to the passage hole 75 from the first fuel tank 8 by the pump.

The passage hole 80 leads to the first end portion of the micro passage 53c formed in the combustor 53 through the support member 64, the power generating fuel evaporator 55, the combustor 52, the support member 66, the carbon monoxide remover 57, the combustor 54, the support member 68, and the reformer 56 from the other end portion of the micro passage 51e.

The passage hole 81 leads to the second end portion of the micro passage 53c formed in the combustor 53 through the support member 70, the heat insulating package 58, the heat insulating support member 62, the combustion fuel evaporator 51, the support member 64, the power generating fuel evaporator 55, the combustor 52, the support member 66, the carbon monoxide remover 57, the combustor 54, the support member 68, and the reformer 56 from the lower end of the support member 70. Moreover, the passage hole 81 leads to the second end portion of the micro passage 52c in the combustor 52 on route. Moreover, the passage hole 81 leads to the second end portion of the micro passage 57c in the carbon monoxide remover 57 on route. Furthermore, the passage hole 81 leads to the second end portion of the micro passage 54c in the combustor 54 on route. Moreover, in the enclosure 30 of the power generating module 3, a passage is formed that leads to the slits 31, 31, . . . from the passage hole 81. A pump is provided between the slits 31, 31, . . . and the passage hole 81, and an external air is sucked to the passage hole 81 by the pump.

The passage hole 82 leads to one end portion of the micro passage 55c formed in the power generating fuel evaporator 55 through the support member 69, the heat insulating package 58, the heat insulating support member 61, the combustion fuel evaporator 51, and the support member 63 from the lower end of the support member 69. Moreover, the passage of the second suction nipple portion 36 leads to the passage hole 82. A pump is provided between the second suction nipple portion 36 and the passage hole 82. The power generating fuel 99 is supplied to the passage hole 82 from the second fuel tank 9 by the pump.

The passage hole 83 leads to one end portion of the micro passage 56c formed in the reformer 56 through the combustor 52, the support member 65, the carbon monoxide remover 57, the combustor 54, and the support member 67 from the other end portion of the micro passage 55c.

The passage hole 85 leads to the first end portion of the micro passage 57c formed in the carbon monoxide remover 57 through the support member 67 and the combustor 54, from the other end portion of the micro passage 56c.

The passage hole 86 leads to the lower end of the support member 69 through the support member 65, the combustor 52, the power generating fuel evaporator 55, the support member 63, the combustion fuel evaporator 51, the heat insulating support member 61, the heat insulating package 58, and the support member 69 from the third end portion of the micro passage 57c. In the enclosure 30 of the power generating module 3, a passage is formed that leads to a fuel polarity of the fuel cell 91 to be described later from the lower end of the passage hole 86.

The passage hole 84 leads to the third end portion of the micro passage 53c formed in the combustor 53 through the support member 69, the heat insulating package 58, the heat insulating support member 61, the combustion fuel evaporator 51, the support member 63, the power generating fuel evaporator 55, the combustor 52, the support member 65, the carbon monoxide remover 57, the combustor 54, the support member 67, and the reformer 56 from the lower end of the support member 69. Moreover, the passage hole 84 leads to the third end portion of the micro passage 52c in the combustor 52 on route. Moreover, the passage hole 84 leads to the third end portion of the micro passage 54c in the combustor 54 on route. Moreover, in the enclosure 30 of the power generating module 3, a passage is formed that leads to the air holes 33, 33, ... from lower end of the passage hole 84 via a valve. The by-product generated by the small size reforming apparatus 50 is discharged through the air holes 33, 33 ... Similarly, in the enclosure 30, a passage is formed that leads to the second drainage pipe 34 via the valve from the lower end of the passage 84. The by-product generated by the small size reforming apparatus 50 is discharged to drainage vessel 15 of the fuel storage module 2 through the second drainage pipe 34.

An explanation will be next of the fuel cell 91. The fuel cell 91 includes fuel polarity (cathode), air polarity (anode), and an ion-conducting film. In the fuel polarity, catalyst particles are contained or catalyst particles are adhered. In the air polarity catalyst particles are contained or catalyst particles are adhered. The ion-conducting film is disposed between the fuel polarity and the air polarity.

In the fuel cell 91, when hydrogen gas is supplied to the fuel polarity, a hydrogen ion where an electron is separated by the catalyst of the fuel polarity is generated as in the following electrochemical reaction formula (4). The hydrogen ion is conducted to the air polarity through the ion-conducting film, and an electron is extracted from the fuel polarity.

$$3H_2 \rightarrow 6H^+ + 6e \quad (4)$$

On the other hand, when an oxygen gas is supplied to the air electrode, a hydrogen ion passed through the ion-conducting film, the oxygen gas and the electron are reacted with one another to generate water as a by-product as in the following electrochemical reaction formula (5).

$$6H^+ + 3/2O_2 + 6e \rightarrow 3H_2O \quad (5)$$

The aforementioned electrochemical reaction occurs by the fuel cell 91 to generate electric energy.

As mentioned above, in the enclosure 30 of the power generating module 3, the passage is formed that leads to the passage hole 86 from the fuel polarity of the fuel cell 91, so that fluid such as hydrogen gas and the like flows to the fuel polarity from the passage hole 86. While, the passage is formed that leads to the slits 31, 31, ... from the air polarity of the fuel cell 91 and the pump is provided between the slits 31,31, ... and the air polarity, and the external air is sucked to the air polarity by the pump. Moreover, in the enclosure 30, the passage is formed that leads to the second drainage pipe 34 from the air polarity of the fuel cell 91 via the valve, and water as the by-product generated by the fuel cell 911 is discharged to the drainage vessel 15 of the fuel storage module 2 through the second drainage pipe 34.

Figure 16:
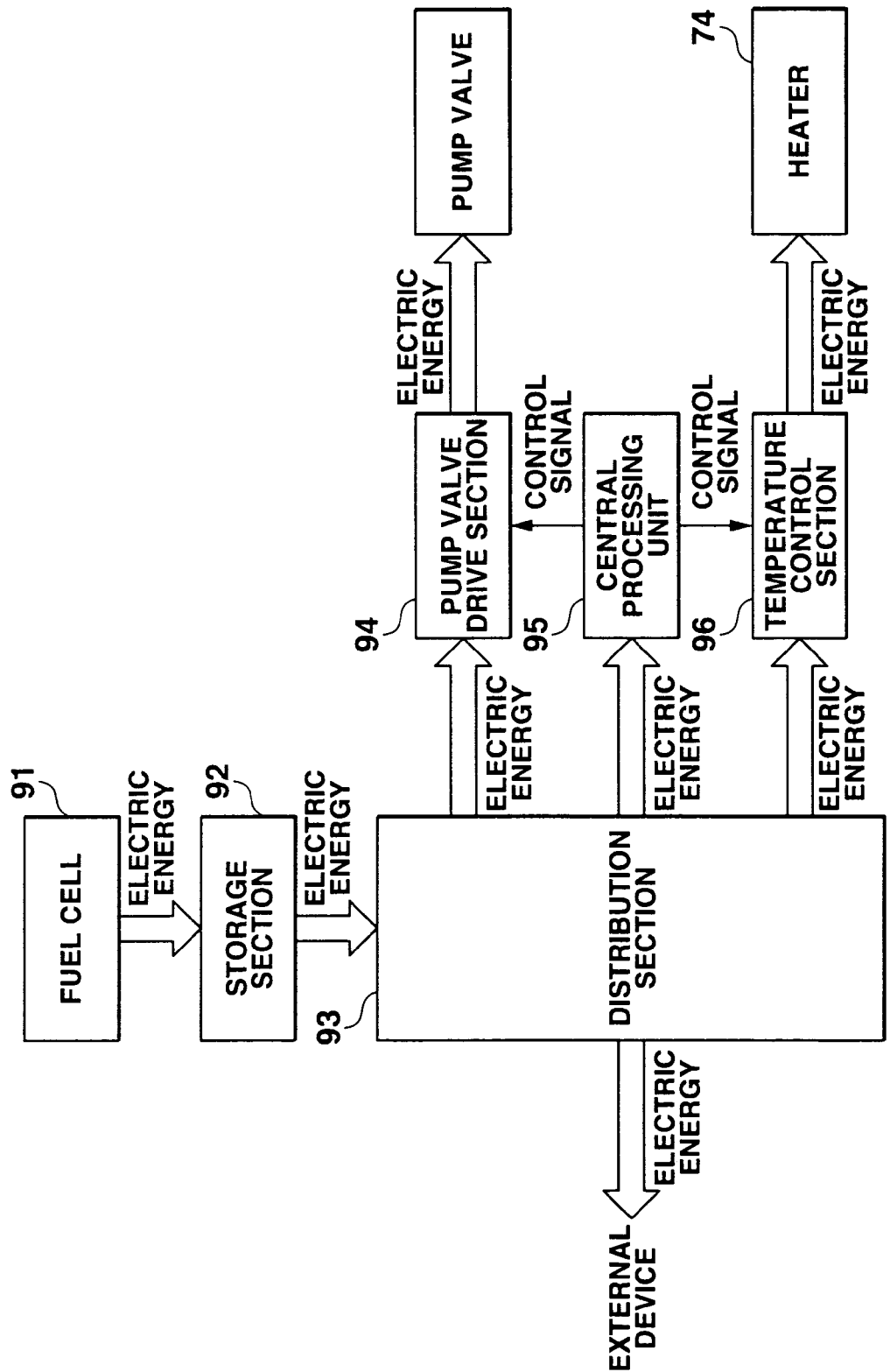
FIG. 16 is a block diagram illustrating a control configuration of a power generating system.

An explanation will be next given of a control configuration of the power generating system 1 with reference to the block diagram of FIG. 16.

The electric energy generated by the fuel cell 91 is supplied to a storage section 92. The electric energy supplied to the storage section 92 is stored in the storage section 92. The electric energy stored in the storage section 92 is supplied to external devices, namely, a central processing unit 95, a pump value drive section 94, and a temperature control section 96 by a distribution section 93. The central processing unit 95 outputs a control signal to the pump valve drive section 94 or the temperature control section 96. The pump valve drive section 94 supplies the electric energy to each pump and each valve provided in the power generating module 3 to drive each pump and each valve based on the control signal sent from the central processing unit 95. The temperature control section 96 supplies the electric energy to the heater 74 provided in the small size reforming apparatus 50 to cause the heater 74 to generate heat based on the control sent from the central processing unit 95. The aforementioned storage section 92, distribution section 93, pump and valve drive section 94, central processing section 95, and temperature control section 96 are built in the power generating module 3.

An explanation will be next given of an operation of the above-structured power generating system 1.

First of all, in order to start up the power generating system 1, the central processing unit 95 is operated by the electric energy prestored in the storage section 92 to output the control signal to the valve drive section 94 and the temperature control section 96. As a result, the electric energy stored in the storage section 92 is supplied to the heater 74 through the distribution section 93 and the temperature control section 96. Moreover, the electric energy stored in the storage section 92 is supplied to each pump and each valve provided in the power generating module 3 through the distribution section 93 and the valve drive section 94. Accordingly, the heater 74 generates heat, so that the entire interior of the heat insulating package, namely, the combustion fuel evaporator 51, the combustors 52 to 54, the reformer 56, and the carbon monoxide remover 57 is heated by heat conduction.

Moreover, by the operation of each valve and each pump, the external air is sucked from the slits 31, 31, ... to flow into the passage hole 81, and is supplied to the micro passage 52c of the combustor 52, the micro passage 57c of the carbon monoxide remover 57, the micro passage 54c of the combustor 54, and the micro passage 53c of the combustor 53. Moreover, by the operation of each valve and each pump, the combustion fuel 98 of the combustion fuel tank 8 is sucked by the first suction nipple portion 35 to flow into the micro passages 75, 77, and 79, respectively, and is supplied to the micro passages 51c, 51d, and 51e of the combustion fuel evaporator 51, respectively. Furthermore, by the operation of each valve and each pump, the power generating fuel 99 of the second fuel tank 9 is sucked by the second suction nipple portion 36 to flow into the micro passage 83 and is supplied to the micro passage 55c of the power generating fuel evaporator 55.

The combustion fuel 98 supplied to the micro passages 51c, 51d, and 51e of the combustion fuel evaporator 51 is heated when flowing in the micro passages 51c, 51d, and

51e. As a result, the combustion fuel 98 of liquid is phase-changed to gas with endotherm. The combustion fuel 98 evaporated at the micro passage 51c flows through the passage hole 76 and is supplied to the micro passage 52c of the combustor 52. The combustion fuel 98 evaporated at the micro passage 51d flows through the passage hole 78 and is supplied to the micro passage 54c of the combustor 54. The combustion fuel 98 evaporated at the micro passage 51e flows through the passage hole 80 and is supplied to the micro passage 53c of the combustor 53.

When the combustion fuel 98 supplied to the micro passage 52c of the combustor 52 flows in the micro passage 52c, the combustion fuel 98 supplied to the micro passage 52c of the combustor 52 is oxidized with the oxygen in the air similarly supplied to the micro passage 52c, thereby causing combustion in the micro passage 52c. Though the entire interior of the heat insulating package 58 is heated by combustion heat at this time, the power generating fuel evaporator 55 is particularly heated well. Similarly, though the combustion fuel 98 is burned in the combustor 53 and the entire interior of the heat insulating package 58 is heated by combustion heat, the reformer 56 is particularly heated well. Similarly, though the combustion fuel 98 is burned in the combustor 54 and the entire interior of the heat insulating package 58 is heated by combustion heat, the carbon monoxide remover 57 is particularly heated well.

Water and carbon dioxide generated by combustion of each of the micro passages 52c, 53c, and 54c flow through the passage hole 84 and discharged outside through the air holes 33, 33, . . . or discharged to the drainage container 15 through the drainage pipes 34 and 7. In the drainage container 15, water is stored.

The power generating fuel 99 supplied to the micro passages 55c of the power generating fuel evaporator 55 is heated when flowing in the micro passage 55c. As a result, the power generating fuel 99 of liquid is phase-changed to a gaseous mixture of methanol and water with endotherm. The gaseous mixture evaporated at the micro passage 55c flows through the passage hole 83 and is supplied to the micro passage 56c of the reformer 56.

The gaseous mixture supplied to the micro passage 56c of the reformer 56 is heated when flowing in the micro passage 56c, and the chemical reaction as in the aforementioned formula (3) is caused by the reforming reaction application catalyst with endotherm. This generates hydrogen gas and carbon dioxide gas. Moreover, the gaseous mixture flowing in the micro passage 56c is not completely reformed to the hydrogen gas and the carbon dioxide gas in some cases, so that a chemical reaction as shown in the following chemical reaction formula (6) slightly occurs to generate carbon dioxide gas, carbon monoxide gas, and water.

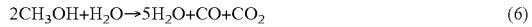

$$2CH_3OH + H_2O \rightarrow 5H_2O + CO + CO_2 \qquad (6)$$

The gaseous mixture of hydrogen gas, carbon dioxide gas, carbon monoxide gas, and steam generated at the micro passage 56c of the reformer 56 flows through the passage hole 85 and is supplied to the micro passage 57c of the carbon monoxide remover 57. The gaseous mixture supplied to the micro passage 57c is heated when flowing to the confluence from the passage hole 81, so that the chemical reaction as in the chemical reaction formula (1) is caused by the water shift application catalyst with endotherm. This decreases the carbon monoxide contained in the gaseous mixture to detoxicate the gaseous mixture.

Moreover, when the gaseous mixture flowing in the micro passage 57c leads to the confluence from the passage hole 81, the gaseous mixture is mixed with the air supplied to the micro passage 57c. Then, the gaseous mixture containing the air is heated when flowing through the passage hole 86 from the confluence, so that the chemical reaction as in the chemical reaction formula (2) is caused by the selective oxidation reaction catalyst with endotherm. Here, since the selective oxidation reaction catalyst selectively accelerates the chemical reaction of the chemical reaction formula (2), hydrogen contained in the gaseous mixture is little oxidized.

At the time when the gaseous mixture flowing in the micro passage 57c leads to the passage hole 86, carbon monoxide is little contained in the gaseous mixture, and the concentration of hydrogen gas and that of carbon dioxide are extremely high. Then, the gaseous mixture with high concentration of hydrogen gas and that of carbon dioxide flows through the passage hole 86 and is supplied to the fuel polarity of the fuel cell 91. In the fuel cell 91, the hydrogen gas in the gaseous mixture causes a reaction as in the electrochemical reaction formula (4) at the fuel polarity, and the oxygen gas is supplied to he air polarity through the slits 31, 31, . . . to cause a reaction as in the electrochemical reaction formula (5). By the electrochemical reaction formulas (4) and (5), electric energy is generated in the fuel cell 91 and the generated electric energy is stored in the storage section 92, and further supplied to the external device through the distribution section 93. Moreover, carbon dioxide gas in the gaseous mixture supplied to the fuel polarity does not react and is discharged to the outside through the air holes 33, 33 . . . Moreover, water generated at the air polarity is discharged to the outside through the air holes 33, 33 . . . or drained to the drainage vessel 15 through the drainage pipes 34, 7. In he drainage vessel 15, water is stored.

The following will explain the operation of heat at the small size reforming apparatus 50 of the power generating system 1 in operation and the effect of this embodiment.

(a) The heat generating sections of the small size reforming apparatus 50 are described as follows and heat is transmitted from the heat generating sections.

Heat generating sections . . . heat by the heater 74, combustion heat by the combustor 52, combustion heat by the combustor 53, combustion heat by the combustor 54, reaction heat of the water shift reaction and reaction heat of the selective oxidation reaction by the carbon monoxide remover 57

(b) The heat absorbing sections of the small size reforming apparatus 50 are descried as follows and heat is transmitted to the heat absorbing sections from the heat generating sections.

Heat absorbing sections . . . reforming reaction by the combustion fuel evaporator 51, evaporation by the power generating fuel evaporator 55, and evaporation by the reformer 56

(c) Exhaust heat occurs when the gaseous mixture flowing through the passage hole 86 flows outside the small size reforming apparatus 50.

(d) Exhaust heat occurs when water and carbon dioxide flowing through the passage hole 84 flow outside the small size reforming apparatus 50.

(e) Since the heat insulating support members 61, 62, the combustion fuel evaporator 51, the support members 63, 64, the power generating fuel evaporator 55, the combustor 52, the support member 65, 66, the carbon monoxide remover 57, the combustor 54, the support members 67, 68, the reformer 56, and the combustor 53 are stacked in order in the heat insulating package 58, heat conduction occurs in the low temperature section from the high temperature section.

(f) Heat radiation occurs from the high temperature section in the heat insulating package 58 and an electromagnetic wave is propagated to the low temperature section and radiant heat is also transmitted to the lower section.

(g) A reforming reaction efficiently occurs when the temperature of the reformer 56 is 200° C. to 300° C., water shift reaction and selective oxidation reaction reactions efficiently occur when the temperature of the carbon monoxide remover 57 is 125° C. to 200° C., evaporation of the power generating fuel 99 efficiently occurs when the temperature of the power generating fuel evaporator 55 is 100° C. to 150° C., and evaporation of the combustion fuel 98 efficiently occurs when the temperature of the combustion fuel evaporator 51 is 80° C. to 120° C.

(h) Heat is transmitted as in the aforementioned (a) to (f), so that the temperature of each section in the heat insulating package 58 is in a stationary state. Here, the order in which the combustion fuel evaporator 51, the power generating fuel evaporator 55, the carbon monoxide remover 57, and the reformer 56, are stacked is the order that efficiently causes evaporation or reaction. Accordingly, it is possible to minimize heat energy that is needed to maintain stationary temperature distributions where the temperature of the reformer 56 is 200° C. to 300° C., the temperature of the carbon monoxide remover 57 is 125° C. to 200° C., the temperature of the power generating fuel evaporator 55 is 100° C. to 150° C., and the temperature of the combustion fuel evaporator 51 is 80° C. to 120° C., namely, heat energy generated by the heater 74 and the combustors 52 to 54. Therefore, a heat loss extremely reduces and thermal efficiency for evaporation and reforming increases.

(i) The winding micro passages 55c, 55c, 56c and 57c are formed in the interior of each of the combustion fuel evaporator 51, the power generating fuel evaporator 55, the reformer 56, and the carbon monoxide remover 57. Accordingly, in connection with the micro passages 51c, 55c, 56c and 57c, the ratio of the inner surface area to the unobstructed capacity is high, so that heat can be more easily transmitted to the fluid flowing in the micro passages 51c, 55c, 56c and 57c. Moreover, the winding micro passages 52c, 53c, and 54c are formed in the interior of each of the combustors 52 to 54. Accordingly, combustion heat can be easily transmitted to the combustors 52 to 54 and more easily transmitted to the combustion fuel evaporator 51, the power generating fuel evaporator 55, the reformer 56, and the carbon monoxide remover 57. Therefore, thermal efficiency of the small size reforming apparatus 50 is high.

(j) The heat insulating support members 61 and 62 with a low thermal conductivity only come in contact with the inner wall of the heat insulating package 58, and the other support members 63 to 68, the combustion fuel evaporator 51, the power generating fuel evaporator 55, the combustors 52 to 54, the reformer 56, and the carbon monoxide remover 57 are separated from the heat insulating package 58. For this reason, heat conduction is little provided to the heat insulating package 58 from each section of the heat insulating package 58 and heat is little exhausted outside the heat insulating package 58. Accordingly, the thermal efficiency of the small size reforming apparatus 50 is high.

(k) The radiation-reflecting layer is formed on the inner of the heat insulating package 58. For this reason, the electromagnetic wave emitted from each section in the heat insulating package 58 by the heat radiation is reflected by radiation-reflecting layer, so that no heat radiation is transmitted to the heat insulating package 58. Accordingly, heat is little exhausted outside the heat insulating package 58.

(l) When the inner space 59 of the heat insulating package 58 is under pressure of 1 Pa or less, the internal space 59 is extremely rare, so that no convection occurs in the inner space 59 and the heat loss is little caused by the convection. While, the inner space 59 is filled with methane containing fluorine or polyhalogenated derivative gas of ethane and carbon dioxide, methane containing fluorine, polyhalogenated derivative gas of ethane and carbon dioxide are extremely low in thermal conductivity as compared with the air. For this reason, heat conduction is little provided to the heat insulating package 58 from each section of the heat insulating package 58 and heat is little exhausted outside the heat insulating package 58. Accordingly, the thermal efficiency of the small size reforming apparatus 50 is high.

(m) The combustion fuel evaporator 51, the power generating fuel evaporator 55, he combustors 52 to 54, the reformer 56, and the carbon monoxide remover 57 are contained together in one heat insulating package 58. This makes it possible to miniaturize the small size reforming apparatus 50 as compared with the case in which these devices are contained in the heat insulating package, separately. Since the combustion fuel evaporator 51, the power generating fuel evaporator 55, the combustors 52 to 54, the reformer 56, and the carbon monoxide remover 57 are stacked, thereby making them compact. This makes it possible to reduce the heat insulating package 58 and miniaturize the small size reforming apparatus 50.

(n) The support members 63 to 68 are used for heat conduction and piping among the combustion fuel evaporator 51, the power generating fuel evaporator 55, the combustors 52 to 54, the reformer 56, and the carbon monoxide remover 57. This eliminates the need for providing the pipes in the heat insulating package 58, separately. This makes it possible to reduce the number of parts of the small size reforming apparatus 50 and miniaturize the small size reforming apparatus 50.

In addition, the present invention is not limited to the aforementioned embodiment and various improvement and changes of design may be made thereunto without departing from the broad spirit and scope of the invention.

For example, regarding the combustion fuel evaporator 51, the power generating fuel evaporator 55, the combustors 52 to 54, the reformer 56, and the carbon monoxide remover 57, the internal space formed in each of these devices was shaped like a winding passage. However, the internal space may be simply a hollow chamber.

Furthermore, if heat is generated by only the heater 74 and the reformer 56 reaches a temperature stationary state at 200° C. to 300° C., the carbon monoxide remover 57 reaches a temperature stationary state at 120° C. to 200° C., and the power generating fuel evaporator 55 reaches a temperature stationary state at 100° C. to 150° C., the combustors 52 to 54 do not have to be provided. In this case, the heat insulating support members 61, 62, the power generating fuel evaporator 55, the support member 65, 66, the carbon monoxide remover 57, the support members 67, 68, and the reformer 56 may be stacked in order from the inner wall bottom surface of the heat insulating package 58, and the heater 74 may be provided on the upper surface of the reformer 66. With the omission of the combustors 52 to 54, the passage where the combustion fuel 98 flows and the first fuel tank may not be provided.

Figure 17:
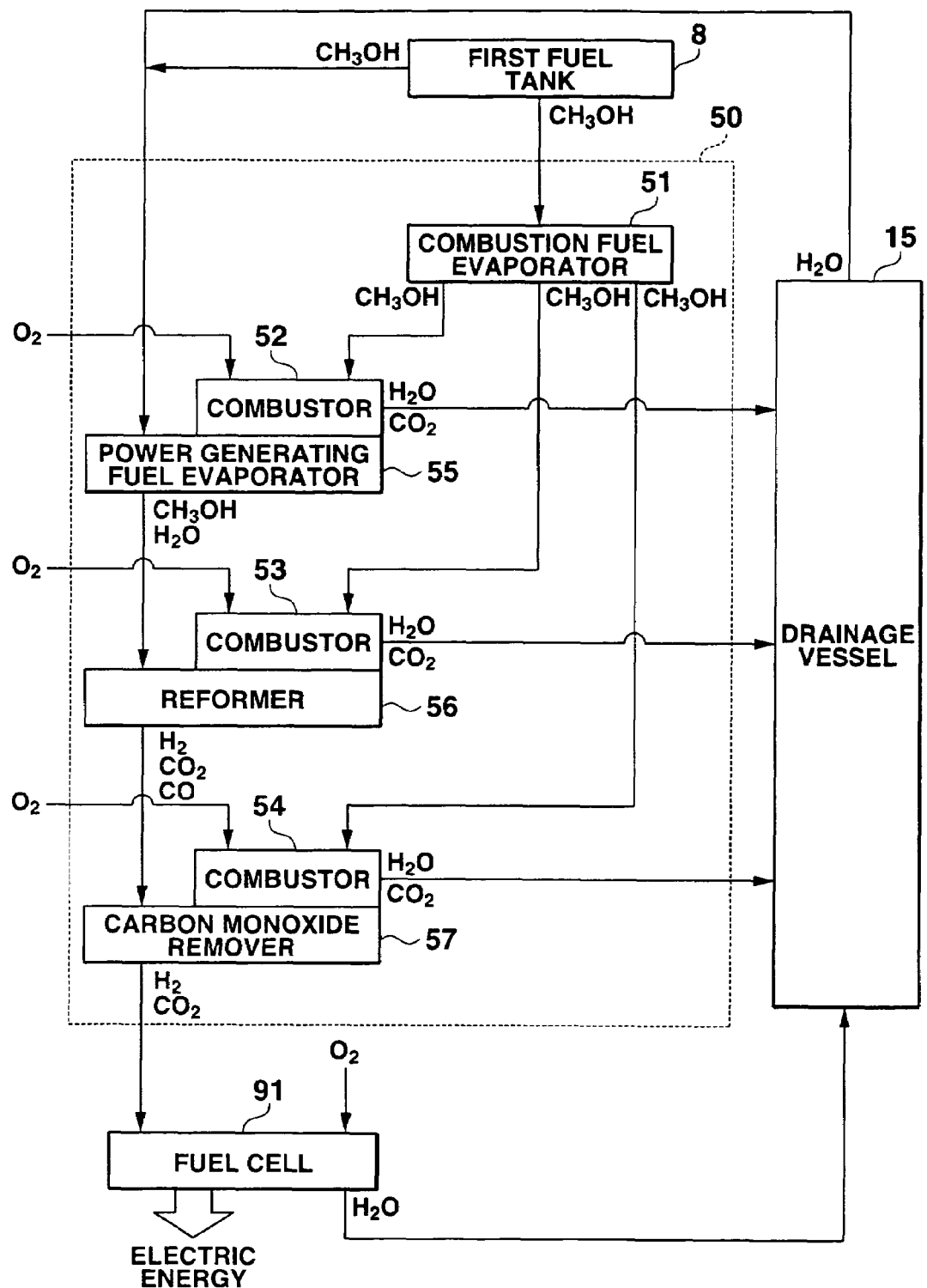
FIG. 17 is a block diagram illustrating a basic configuration of a power generating system as a modification.

Moreover, in the fuel storage module 2, two fuel tanks 2 and 3 were provided. However, only the first fuel tank 8 that stores methanol may be provided in the fuel storage module 2. In this case, the power generating system 1 is configured as illustrated in FIG. 17. Namely, the power generating fuel supplied to the power generating fuel evaporator 55 is a liquid mixture of water stored in the drainage vessel 15 and the combustion fuel 98 (methanol) stored in the first fuel tank 8. In this case, the passage of the first suction nipple section 35 leads to the passage hole 82 and a pump is provided between the first suction nipple section 35 and the passage hole 82. Methanol is supplied to the passage hole 82 from the first fuel tank 8 by the pump. Furthermore, a passage is formed that leads to the passage hole 82 from the drainage vessel 15 and a pump is provided between the drainage vessel 15 and the passage hole 82. Water is supplied to the passage hole 82 from the drainage vessel 15.

Furthermore, in the above embodiment, the first fuel tank 8 and the second fuel tank 9 were provided, separately. However, only the second fuel tank 9 is configured, so that fuel may be supplied to the combustion fuel evaporator 51 and the power generating fuel evaporator 55.

Moreover, in the above embodiment, any one of the combustors 52 to 54 was provided in each of the combustion fuel evaporator 51, the power generating fuel evaporator 55, the reformer 56, and the carbon monoxide remover 57. However, the combustor may be provided to only a section for which high temperature is most required. In this case, for example, the combustor 52 is provided to only the reformer 56 and the remaining heat of the combustor 52 may be used to heat the carbon monoxide remover 57 and the power generating fuel evaporator 55. At this time, heaters 71 to 74 may be provided to the power generating fuel evaporator 55, the reformer 56, and the carbon monoxide remover 57, respectively, in order to make a fine adjustment of each temperature. Only one of the heaters 71 to 74 may be used and two to three of the heaters 71 to 74 may be used.

Furthermore, the above embodiment did not refer to the size of each of the heaters 71 to 74. However, a contact area between the heater of the reactor with relatively high temperature and the reactor may be larger than a contact area between the heater of the reactor that needs relatively low temperature and the reactor. The volume of the heater of the reactor with relatively high temperature may be larger than the volume of the heater of the reactor that needs relatively low temperature. The thickness of the heater of the reactor with relatively high temperature may be larger than the thickness of the heater of the reactor that needs relatively low temperature.

Moreover, the above embodiment did not refer to the size of each of the combustors 52 to 54. However, a contact area between the combustor of the reactor with relatively high temperature and the reactor may be larger than a contact area between the combustor of the reactor that needs relatively low temperature and the reactor. The capacity in the passage of the combustor of the reactor with relatively high temperature may be larger than the capacity in the passage of the combustor of the reactor that needs relatively low temperature.

According to the present invention, since the multiple reactors are contained by the heat insulating package, the heat of these reactors is enclosed in the heat insulating package and the heat losses of these reactors can be extremely reduced. Moreover, since the multiple reactors are supported by the heat insulating member to be separated from the inner wall of the heat insulating package, the heat of these reactors cannot be easily conducted to the heat insulating package. Accordingly, the heat losses of these reactors can be reduced.

Then, the multiple reactors are contained together in one heat insulating package, thereby making it possible to miniaturize the reforming apparatus as compared with the case in which each of the multiple reactors is contained in each heat insulating package. In addition, since the multiple reactors are stacked in the heat insulating package, these reactors are made compact and the heat insulating package itself can be reduced, with the result that the reforming apparatus can be miniaturized.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-82149 filed on Mar. 25, 2003 and including specification, claims, drawings and summary. The disclosure of the above Japanese Patent Application is incorporated herein by reference in its entirety.

What is claimed is:

1. A reforming apparatus that generates hydrogen from fuel, comprising:
   a plurality of reactors each having an internal space for reacting fuel, and each having a respective operating temperature; and
   a heat insulating package which contains the plurality of reactors, and which comprises a plurality of sides including:
      only one support side which is provided with at least one support that: (i) includes at least one first passage hole for supplying the fuel to the reactors and at least one second passage hole for draining generated hydrogen from the reactors, and (ii) supports the plurality of reactors to be separated from an inner wall of the heat insulating package; and
      at least one non-support side which is not provided with the support;
   wherein the plurality of reactors are stacked upwardly in an increasing order of the respective operating temperatures from the one support side of the heat insulating package.

2. The reforming apparatus according to claim 1, wherein at least one support member that supports the plurality of reactors to be spaced from one another is disposed between adjacent reactors among the plurality of reactors.

3. The reforming apparatus according to claim 2, wherein said at least one support member includes a support member passage hole, and the internal spaces of the plurality of reactors communicate with one another through the support member passage hole.

4. The reforming apparatus according to claim 1, wherein the plurality of reactors include a first evaporator that evaporates a liquid mixture of fuel and water, a reformer that reforms the liquid mixture of fuel and water evaporated by the first evaporator to a gaseous mixture containing hydrogen gas, and a carbon monoxide remover that reacts carbon monoxide contained in the gaseous mixture to remove the carbon monoxide, and
   wherein the first evaporator, the carbon monoxide remover and the reformer are stacked in order upwardly from the the one support side of the heat insulating package.

5. The reforming apparatus according to claim 1, further comprising a combustor corresponding to at least one of the plurality of reactors.

6. The reforming apparatus according to claim 4, further comprising a second evaporator that evaporates fuel, and a first combustor that burns fuel evaporated by the second evaporator, wherein the second evaporator, the first evaporator, the first combustor, the carbon monoxide remover, a second combustor, the reformer, and a third combustor are stacked in order upwardly from the the one support side of the heat insulating package.

7. The reforming apparatus according to claim 6, further comprising:
- a first support member that is disposed between the second evaporator and the first evaporator to support the second evaporator and the first evaporator to be separated from each other;
- a second support member that is disposed between the first combustor and the carbon monoxide remover to support the first combustor and the carbon monoxide remover to be separated from each other; and
- a third support member that is disposed between the second combustor and the reformer to support the second combustor and the reformer to be separated from each other.

8. The reforming apparatus according to claim 1, wherein a radiation-reflecting layer is formed on the inner wall of the heat insulating package.

9. The reforming apparatus according to claim 8, wherein the radiation-reflecting layer is formed of at least one of Au, Ag, and Al.

10. The reforming apparatus according to claim 1, wherein an interior pressure of internal space in the heat insulating package is set to 1 Pa or less.

11. The reforming apparatus according to claim 1, wherein an interior of the heat insulating package is filled with an inert gas selected from methane containing fluorine, polyhalogenated derivative gas of ethane and carbon dioxide.

12. The reforming apparatus according to claim 1, wherein the internal space of any one of the plurality of reactors is partially shaped like a winding passage.

13. The reforming apparatus according to claim 7, wherein a pathway is formed through the heat insulating package and the support provided on the support side of the heat insulating package that leads to the internal space of the second evaporator from outside the heat insulating package.

14. A reforming apparatus according to claim 1, wherein the plurality of reactors include:
- a reformer that reforms fuel in the internal space of the reformer;
- an evaporator that evaporates fuel in the internal space of the evaporator; and
- a heat propagating section disposed between the reformer and the evaporator to propagate heat generated by the reformer to the evaporator.

15. The reforming apparatus according to claim 14, wherein the heat propagating section is a carbon monoxide remover.

16. The reforming apparatus according to claim 14, wherein at least one support member is disposed among the reformer, the evaporator, and the heat propagating section.

17. The reforming apparatus according to claim 16, wherein the support member includes a support member passage hole, and the internal spaces of the reformer and the evaporator communicate with each other through the support member passage hole.

18. A reforming apparatus that generates hydrogen from fuel, comprising:
- a plurality of reactors each having an internal space for reacting fuel;
- a heat insulating package that contains the plurality of reactors; and
- a heat insulator that supports the plurality of reactors to be separated from an inner wall of the heat insulating package;
- wherein the plurality of reactors include a first evaporator that evaporates a liquid mixture of fuel and water, a reformer that reforms the liquid mixture of fuel and water evaporated by the first evaporator to a gaseous mixture containing hydrogen gas, and a carbon monoxide remover that reacts carbon monoxide contained in the gaseous mixture to remove the carbon monoxide, and wherein the first evaporator, and the carbon monoxide remover and the reformer are stacked in order upwardly from the heat insulator; and
- wherein the plurality of reactors further include a second evaporator that evaporates fuel, and a first combustor that burns fuel evaporated by the second evaporator, and wherein the second evaporator, the first evaporator, the first combustor, the carbon monoxide remover, a second combustor, the reformer, and a third combustor are stacked in order upwardly from the heat insulator.

19. The reforming apparatus according to claim 18, further comprising:
- a first support member that is disposed between the second evaporator and the first evaporator to support the second evaporator and the first evaporator to be separated from each other;
- a second support member that is disposed between the first combustor and the carbon monoxide remover to support the first combustor and the carbon monoxide remover to be separated from each other; and
- a third support member that is disposed between the second combustor and the reformer to support the second combustor and the reformer to be separated from each other.

20. The reforming apparatus according to claim 19, wherein a pathway is formed through the heat insulating package and the heat insulator that leads to the internal space of the second evaporator from outside the heat insulating package.

* * * * *